(12) United States Patent
Pancorbo Marcos et al.

(10) Patent No.: US 9,094,437 B2
(45) Date of Patent: Jul. 28, 2015

(54) SYSTEM, POLICY NODES, AND METHODS TO PERFORM POLICY PROVISIONING OF TRAFFIC OFFLOADED AT A FIXED BROADBAND NETWORK

(75) Inventors: Maria Belen Pancorbo Marcos, Madrid (ES); Stefan Rommer, Västra Frölunda (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 246 days.

(21) Appl. No.: 13/549,816

(22) Filed: Jul. 16, 2012

(65) Prior Publication Data

US 2014/0016629 A1 Jan. 16, 2014
US 2015/0063328 A9 Mar. 5, 2015

Related U.S. Application Data

(60) Provisional application No. 61/590,569, filed on Jan. 25, 2012.

(51) Int. Cl.
*H04L 29/08* (2006.01)
*H04W 76/02* (2009.01)
*H04L 29/06* (2006.01)
*H04W 28/08* (2009.01)
*H04W 76/04* (2009.01)

(52) U.S. Cl.
CPC .............. *H04L 67/141* (2013.01); *H04L 69/18* (2013.01); *H04W 76/026* (2013.01); *H04W 28/08* (2013.01); *H04W 76/041* (2013.01)

(58) Field of Classification Search
None
See application file for complete search history.

(56) References Cited

U.S. PATENT DOCUMENTS

| | | | |
|---|---|---|---|
| 2012/0281674 A1* | 11/2012 | Jackson et al. | 370/331 |
| 2012/0324100 A1* | 12/2012 | Tomici et al. | 709/224 |
| 2013/0070594 A1* | 3/2013 | Garcia Martin et al. | 370/235 |
| 2014/0078967 A1* | 3/2014 | Turanyi et al. | 370/328 |

OTHER PUBLICATIONS $3^{rd}$ Generation Partnership Project; Technical Specification Group Services and System Aspects; Study on Support of BBF Access Interworking (Release 11). 3GPP TR 23.839 v1.4.1 (Dec. 2011).
ZTE: "BB2 Scope and Scenario discussion". 3GPP TSG SA WG2 Meeting #86. TD S2-113075. Nov. 2011. Naantali, Finland.
Huawei, et al.: "BB3: QoS for Fixed access session". 3GPP TSG-SA WG2 Meeting #88. S2-114917. Nov. 2011. San Francisco, USA.
3GPP $3^{rd}$ Generation Partnership Project; Technical Specification Group Services and System Aspects; Policy and Charging Control Architecture (Release 11). 3GPP TS 23.203 v11.4.0 Dec. 2011.
3GPP $3^{rd}$ Generation Partnership Project Technical Specification Group Services and System Aspects; Study of Support of BBF Access Interworking (Release 11). 3GPP TS 23.839 v.1.4.1. Dec. 2011.

(Continued)

*Primary Examiner* — Habte Mered

(57) ABSTRACT

A system, policy nodes, and methods are described herein for establishing a policy session (e.g., IP-CAN session) for a user equipment between a first policy node (e.g., BPCF) which is associated with a fixed broadband access network (e.g., non-3GPP access network) and a second policy node (e.g., PCRF) which is associated with an evolved packet core network (e.g., 3GPP access network).

21 Claims, 11 Drawing Sheets

(56) References Cited

OTHER PUBLICATIONS

3GPP $3^{rd}$ Generation Partnership Project: Technical Specification Group Services and System Aspects; 3GPP System-Fixed Broadband Access Network Interworking; Stage 2 (Release 11). 3GPP TS 23.139 v1.2.0. Nov. 2011.

3GPP $3^{rd}$ Generation Partnership Project; Technical Specification Group Services and System Aspects; Architecture Enhancements for non-3GPP Accesses (Release 11). 3GPP TS 23.402 v11.1.0 Jan. 2011.

* cited by examiner

SYSTEM, POLICY NODES, AND METHODS TO PERFORM POLICY PROVISIONING OF TRAFFIC OFFLOADED AT A FIXED BROADBAND NETWORK

CLAIM OF PRIORITY

This application claims the benefit of U.S. Provisional Application Ser. No. 61/590,569 filed on Jan. 25, 2012. The contents of this document are hereby incorporated by reference herein.

TECHNICAL FIELD

The present invention relates to a system, policy nodes, and methods for establishing a policy session (e.g., IP-CAN session) for a user equipment between a first policy node (e.g., BPCF) which is associated with a fixed broadband access network (e.g., non-3GPP access network) and a second policy node (e.g., PCRF) which is associated with an evolved packet core network (e.g., 3GPP access network).

BACKGROUND

The following abbreviations are herewith defined, at least some of which are referred to within the following description of the prior art and the present invention.
3GPP 3rd Generation Partnership Project
AAA Authentication, Authorization, Accounting
AF Application Function
AN Access Network
AP Access Point
BBF Broad-Band Fixed Network
BNG Broadband Network Gateway
BPCF Broadband Policy Control Function
BRAS Broadband Remote Access Server
DSLAM digital subscriber line access multiplexer
EDGE Enhanced Data rates for GSM Evolution
EPC Evolved Packet Core
E-UTRAN Evolved Universal Terrestrial Radio Access Network
GERAN GSM EDGE Radio Access Network
GSM Global System for Mobile Communications
HSS Home Subscriber Server
IMSI International Mobile Subscriber Identity
IP Internet Protocol
IP-CAN IP-Connecting Access Network
NS Non-seamless
OCS Online Charging System
OFCS Offline Charging System
ONT Optical Network Terminal
PCC Policy and Charging
PCRF Policy and Charging Rules Function
PDN GW Public Data Network Gateway
PDP Policy Decision Point
QoS Quality of Service
RG Residential Gateway
SPR Subscriber Profile Repository
UDR User Data Repository
UE User Equipment/User Terminal
UMTS Universal Mobile Telecommunications System
UTRAN UMTS Radio Access Network
WLAN Wireless Local Area Network Referring to FIG. 1 (PRIOR ART), there is a basic diagram of an exemplary telecommunications architecture 100 used to explain a problem that occurs during what is known as a NS-WLAN offload scenario and in particular the problem relates to the establishment of an IP-CAN session 102 for a UE 104 between a BPCF 106 associated with a fixed broadband access network 108 (BBF domain 108) and a PCRF 110 associated with an evolved packet core network 112 (EPG network 112). In the NS-WLAN offload scenario, the UE 104 has accessed the fixed broadband access network 108 via a WLAN access point 113 on a customer premises network 114 and requests to offload traffic 116 through the WLAN access point 113, the fixed broadband access network 108 to a 3GPP operator network 118 (e.g., Internet) without the traffic 116 being routed through the EPC network 112 (EPC domain 112). During the NS-WLAN offload scenario, the PCRF 110 is to provide policy control via the IP-CAN session 102 for the traffic 116 that the UE 104 offloads in the BBF domain 108 but this traffic 116 is not routed through the EPC network 112. A more detailed discussion about the NS-WLAN offload scenario and the problem associated with establishing the IP-CAN session 102 for the NS-WLAN offload scenario are discussed below.

The technical specification 3GPP TS 23.203 (version V11.4.0)(2011-12) (the contents of which are incorporated by reference herein) discloses a Policy and Charging Architecture, PCC 120, in the EPC network 112, which allows among other features the application of charging and QoS policy rules to data flows of data sessions of their users. The PCC 120 architecture disclosed therein comprises, among other entities, a Policy and Charging Rules Function 110 (PCRF 110), and a Policy and Charging Enforcement Function 122 (PCEF 122). Briefly: the PCRF 110 behaves as a Policy Decision Point (PDP), or policy server, to store policies and determine which policies are to be applied in each case, while the PCEF 122 behaves as Policy Enforcing Point (PEP) of those policies. The EPC network 112 is arranged to provide telecommunication services to user terminals (UEs) irrespectively if they connect from the so called "3GPP access networks" (e.g. GERAN, UTRAN, E-UTRAN) or from the so called "non-3GPP access networks" (e.g. fixed access network, wireless local area network, WLAN, or mixing of wireless and fixed access networks, such as WLAN access points 113 which are connected to the fixed broadband access network 108).

The PCC 120 architecture disclosed by 3GPP TS 23.203 V11.4.0 (2011-12) also envisages a Broadband Policy Control Function 106 (BPCF 106) which is used when the 3GPP EPC domain 112 interworks with the broad-band fixed network domain 108 (BBF domain 108), which can comprise WLAN access points 113. The BPCF 106 is also a policy control entity, but is located in the fixed broadband access network 108, and can cooperate via the so called "S9a" interface 124 with the PCRF 110 which belongs to the 3GPP EPC domain 112 when in interworking scenarios.

The technical specification 3GPP TS 23.402 (V11.1.0; 2011-01) (the contents of which are incorporated by reference herein) includes a description of the scenario where a 3GPP UE 104 accesses via the WLAN access point 113 and traffic 116 is offloaded in the local network (fixed broadband access network 108) without being routed via the Evolved Packet Core (EPC) network 112. This scenario, referred to as "Non-Seamless WLAN offload" (NS-WLAN offload), is further considered in other 3GPP documents as discussed below.

In relationship to interworking scenarios with the 3GPP EPC network 112 comprising the PCC 120 architecture, there is a study document addressing the support of BBF access interworking. This study document is referenced as 3GPP TR 23.839 (V1.4.1) (2011-12) (the contents of which are incorporated by reference herein), and discloses (e.g., in the so called "Building Block II" section) how to provide policy control for traffic of the UE 104 connected to the WLAN access point 113 that resides beyond the fixed broadband access network 108 (BBF domain 108) which is offloaded iii the BBF domain 108 (e.g. towards the internet 118), as well as for the traffic 126 which is instead routed by the BBF domain 108 towards the 3GPP EPC network domain 112. The 3GPP TR 23.839 (V.1.4.1) (2011-12) discloses in e.g. chapter 6.1.1.1, the telecommunication architecture arrangements, and signaling interfaces (e.g. the "S9a" interface 124), which are later referred to and described herein.

The telecommunication architectural reference models described in 3GPP TR 23.839 (V.1.4.1) (2011-12)'s chapter 6.1.1.1 shows various architecture scenarios for accessing the EPC network domain 112 through WLAN access points 113 connected to the BBF domain 108 which can allow performing a NS-WLAN offload with respect to the traffic 116 of the UE 104 (only one shown) connected to the BBF domain 108. In all these scenarios, the S9a interface 124 (S9a reference point 124) between the BPCF 106 and the PCRF 110 is used to provision policies for NS-WLAN offloaded traffic 116 and/or to request admission control for EPC routed traffic 126.

The 3GPP TR 23.839 (V.1.4.1) (2011-12) defines that the policies (i.e. information making up policy rules for controlling charging and/or QoS aspects for data flows 116 and 126 originating and/or terminating in UEs 104) to be enforced for offloaded traffic 116 can be provided by the PCRF 110 of the 3GPP EPC network 112 to the BPCF 106 of the BBF domain 108. The IP-CAN session 102 that is used to provision these policies can already be established when the UE 104 attaches to the fixed broadband access network 108 (BBF domain 108) and authenticates before the network entities of the EPC network 112. The IP-CAN session 102 for offloaded traffic 116 then remains established regardless of whether the UE 102 offloads any traffic 116 or not.

Furthermore, the information flows in 3GPP TR 23.839 (V1.4.1)(2011-12) (the contents of which are incorporated by reference herein) shows that the IP-CAN session 102 for the traffic 116 that can be eventually offloaded for the UE 104 by the BBF domain 108 is always established—through the "S9a" interface 124 between the BBF domain 108 and the 3GPP EPC network 112—at the Initial Attach of the UE 104 to the BBF domain 108 (e.g. via a WLAN access) and remains established until the UE 104 detaches, moves to another access, or a server entity in any of the network domains 108 and 112 decides to detach the UE 104. The details of an "Initial Attach" of the UE 104 in this particular interworking situation are shown in clause 6.3.1 of 3GPP TR 23.839 (V1.4.1)(2011-12), and details of a subsequent "Detach" of the UE 104 are shown in clause 6.3.3 of 3GPP TR 23.839 (V1.4.1)(2011-12).

The results of the study document 3GPP TR 23.839 are currently being incorporated in the 3GPP technical specification TS 23.139 (V1.2.0; 2011-11), which specifies features to be implemented by servers of the BBF domain 108 and of the 3GPP EPC network 112 in an interworking scenario as the one studied by the aforementioned 3GPP TR 23.839 (V.1.4.1) (2011-12).

Hence, according to the current solutions (e.g., 3GPP TS 23.139) the IP-CAN session 102 for controlling UE traffic 116 that can be offloaded directly from the BBR domain 108 is established (for the UE 104 connected to the BBF domain 108 e.g. via a WLAN access point 113) between servers of the BBF domain 108 and servers of the 3GPP EPC network domain 112, and the IP-CAN session 102 remains established between the involved nodal entities namely the BPCF 106 and PCRF 110 in these different network domains (i.e. the BBF domain 108 and the 3GPP EPC network domain 112) regardless of whether the UE 104 offloads any traffic 116 or not. This particular fact causes more signaling between these entities namely the BPCF 106 and PCRF 110 thereby adversely affecting their performance.

More specifically, the current PCC information flows (e.g. as generally defined by 3GPP TS 23.203 (V11.4.0)(2011-12) for the 3GPP EPC network 112, and the more specific ones envisaging interworking scenarios between the 3GPP EPC network 112 and the BBF domain 108) all envisage solutions wherein the IP-CAN session 102 is established for requesting and obtaining policy rules as soon as the UE 102 is assigned an IP address. This is illustrated, for example, in the Initial Attach information flows disclosed by the 3GPP TR 23.839 (V.1.4.1)(2011-12) where the successful authentication of the 3GPP UE 104 and the UE's IP address assignment by the BBF domain 108 triggers the establishment of the IP-CAN session 102 for an eventual UE's NS-WLAN offloaded traffic 116.

However, for the case of the UE 104 offloading the traffic 116 at the fixed broadband access network 108 (BBF domain 108), the UE 104 may not be authorized to offload this traffic 116, so that the establishment of the IP-CAN session 102 to request policy rules as soon as the UE 104 is assigned an IP address by the fixed broadband access network 108 (BBF domain 108) can result in a useless provision of policy rules for unauthorized traffic. It may also be the case that the UE 104 is permitted to offload traffic 116 in the fixed broadband access network 108 (BBF domain 108)—e.g. in certain cases—but the EPC operator does not want to provide policy control via the S9a interface 124 (i.e. communicating policy rules to the BPCF 106 in the BBF domain 108) for such traffic 116 depending on the circumstance (e.g. depending on IP-CAN type utilized by the UE 104, or depending on the assigned local IP-address assigned to the UE 104). Or, the EPC operator may only want to provide policy control via the S9a interface for the UE's EPC routed traffic 126 but not for the traffic 116 offloaded through the fixed broadband access network 108.

As a result, the existing solution that the IP-CAN session 102 for offloaded traffic 116 is always established may result in a situation that many IP-CAN sessions 102 are established for UEs but never used. This is a waste of resources in both the BPCF 106 and the PCRF 110. Accordingly, there is a need to address this shortcoming and other shortcomings associated with establishing the IP-CAN session 102 for the NS-WLAN offload scenario. This need and other needs are satisfied by the present invention.

SUMMARY

A system, policy nodes, and methods for establishing a policy session (e.g., IP-CAN session) for a user equipment between a first policy node (e.g., BPCF) which is associated with a fixed broadband access network (e.g., non-3GPP access network) and a second policy node (e.g., PCRF) which is associated with an evolved packet core network (e.g., 3GPP access network) are described in the independent claims of the present application. Advantageous embodiments of the system, the policy nodes, and the methods have been described in the dependent claims of the present application.

In one aspect, the present invention provides a method for establishing a policy session for a user equipment between a first policy node which is associated with a fixed broadband access network and a second policy node which is associated with an evolved packet core network. The method comprises the step of establishing the policy session with respect to traffic of the user equipment connected to the fixed broadband access network where the traffic is to be offloaded by the fixed broadband access network without being routed through the evolved packet core network, where the policy session is established over an interface between the first policy node and the second policy node only if the user equipment is authorized from a node of the evolved packet core network to perform traffic offload in the fixed broadband access network. The method has the advantage in that it saves resources because the policy session is only established after determining that the user equipment is authorized to offload traffic in the fixed broadband access network.

In another aspect, the present invention provides a policy node which is associated with a fixed broadband access network and comprises: (a) a processor; and (b) a memory that stores computer-readable instructions where the processor interfaces with the memory and executes the computer-readable instructions to enable a first receiving operation, a sending operation, and a second receiving operation. The first receiving operation includes receiving a message when a user equipment has been authenticated and an local Internet Protocol address has been assigned by the fixed broadband access network. The send operation includes sending a policy session establishment message over an interface to a policy node associated with an evolved packet core network. The policy session requested to be established is with respect to traffic of the user equipment connected to the fixed broadband access network that is to be offloaded by the fixed broadband access network without being routed through the evolved packed core network. The second receiving operation includes receiving a policy session establishment acknowledgment message from the policy node associated with the evolved packet core network. The policy session establishment acknowledgement message authorizes an establishment of a policy session over the interface for offloaded traffic. The policy session establishment acknowledgement message is received only if the user equipment is allowed to offload traffic in the fixed broadband access network without being routed through the evolved packet core network. The policy node has the advantage in that it saves resources because the policy session is only established after determining that the user equipment is authorized to offload traffic in the fixed broadband access network.

In yet another aspect, the present invention provides a method for establishing a policy session between a first policy node associated with a fixed broadband access network and a second policy node associated with an evolved packet core network. The policy session if established would be with respect to traffic of the user equipment connected to the fixed broadband access network that is to be offloaded by the fixed broadband access network without being routed through the evolved packed core network. The method is implemented by the first policy node and comprises a first receiving step, a sending step, and a second receiving step. The first receiving step includes receiving a message when a user equipment has been authenticated and an local Internet Protocol address has been assigned by the fixed broadband access network. The sending step includes sending a policy session establishment message over an interface to a policy node associated with an evolved packet core network. The second receiving step includes receiving a policy session establishment acknowledgment message from the policy node associated with the evolved packet core network. The policy session establishment acknowledgement message authorizes an establishment of a policy session over the interface for offloaded traffic. The policy session establishment acknowledgement message is received only if the user equipment is allowed to offload traffic in the fixed broadband access network without being routed through the evolved packet core network. The method has the advantage in that it saves resources because the policy session is only established after determining that the user equipment is authorized to offload traffic in the fixed broadband access network.

In still yet another aspect, the present invention provides a policy node which is associated with an evolved packet core network and comprises: (a) a processor; and (b) a memory that stores computer-readable instructions where the processor interfaces with the memory and executes the computer-readable instructions to enable following a receiving operation, a determining operation, and a sending operation. The receiving operation includes receiving a policy session establishment message over an interface from a policy node associated with a fixed broadband access network. The policy session establishment message is a request for authorization to establish a policy session over the interface with respect to traffic of a user equipment connected to the fixed broadband access network that is to be offloaded by the fixed broadband access network without being routed through the evolved packed core network so a user equipment which has been authenticated is allowed to offload traffic in the fixed broadband access network without being routed through the evolved packet core network. The determine operation includes determining if the user equipment is allowed to offload traffic in the fixed broadband access network without being routed through the evolved packet core network. The sending operation is performed if the user equipment is allowed to offload traffic in the fixed broadband access network without being routed through the evolved packet core network and includes sending a policy session establishment acknowledgment message to the policy node associated with the fixed broadband access network. The policy session establishment acknowledgement message authorizes an establishment of the policy session over the interface for offloaded traffic. The policy node has the advantage in that it saves resources because the policy session is only established after determining that the user equipment is authorized to offload traffic in the fixed broadband access network.

In yet another aspect, the present invention provides a method for establishing a policy session between a first policy node associated with a fixed broadband access network and a second policy node associated with an evolved packet core network. The method is implemented by the second policy node and comprises the steps of a receiving step, a determining step, and a sending step. The receiving step includes receiving a policy session establishment message over an interface from the first policy node. The policy session establishment message is a request for authorization to establish a policy session over the interface, where the policy session would be established with respect to traffic of the user equipment connected to the fixed broadband access network that is to be offloaded by the fixed broadband access network without being routed through the evolved packed core network so a user equipment which has been authenticated is allowed to offload traffic in the fixed broadband access network without being routed through the evolved packet core network. The determining operation includes determining if the user equipment is allowed to offload traffic in the fixed broadband access network without being routed through the evolved packet core network. The sending operation is performed if the user equipment is allowed to offload traffic in the fixed broadband access network without being routed through the evolved packet core network and includes sending a policy session establishment acknowledgment message to the first policy node. The policy session establishment acknowledgement message authorizes an establishment of the policy session over the interface for offloaded traffic. The method has the advantage in that it saves resources because the policy session is only established after determining that the user equipment is authorized to offload traffic in the fixed broadband access network.

In still yet another aspect, the present invention provides a system for establishing a policy session for offloaded traffic when a user equipment connects to a fixed broadband access network. If the policy session is established then the user equipment would be allowed to offload traffic through said fixed broadband access network without being routed through an evolved packet core network. The system comprising a first policy node which associated with the fixed broadband access network, and a second policy node which associated with the evolved packet core network. The first policy node is configured to: (a) receive a message when the user equipment has been authenticated and an local Internet Protocol address has been assigned by the fixed broadband access network; (b) send a policy session establishment message over an interface to the second policy node, where the policy session establishment message is a request for authorization to establish the policy session over the interface so the user equipment which has been authenticated is allowed to offload traffic in the fixed broadband access network without being routed through the evolved packet core network. The second policy node is configured to: (i) receive the policy session establishment message over the interface from the first policy node; (ii) determine if the user equipment is allowed to offload traffic in the fixed broadband access network without being routed through the evolved packet core network; and (iii) if the user equipment is allowed to offload traffic in the fixed broadband access network without being routed through the evolved packet core network, then send a policy session establishment acknowledgment message to the first policy node, where the policy session establishment acknowledgement message authorizes an establishment of the policy session over the interface for offloaded traffic. The first node is further configured to: (c) receive the policy session establishment acknowledgment message from the second policy node. The system has the advantage in that it saves resources because the policy session is only established after determining that the user equipment is authorized to offload traffic in the fixed broadband access network.

In yet another aspect, the present invention provides a system for establishing a policy session for offloaded traffic when a user equipment connects to a fixed broadband access network. If the policy session is established then the user equipment would be allowed to offload traffic through said fixed broadband access network without being routed through an evolved packet core network. The system comprising a first policy node which is associated with the fixed broadband access network, a second policy node which is associated with the evolved packet core network, and a data storage node which is associated with the evolved packet core network. The second policy node is configured to: (a) receive an indication of a policy session establishment; (b) request subscriber data associated with the user equipment from the data storage node; (c) receive the requested subscriber data associated with the user equipment from the data storage node; (d) determine based on the received subscriber data if the user equipment is allowed to offload traffic in the fixed broadband access network without being routed through the evolved packet core network; and (e) send a trigger message to the first policy node, where the trigger message indicates whether or not the user equipment is allowed to offload traffic in the fixed broadband access network without being routed through the evolved packet core network. The first policy node is configured to: (i) receive the trigger message from the second policy node; and (ii) send a policy session establishment message to the second policy node if the trigger message indicated that the user equipment is allowed to offload traffic in the fixed broadband access network without being routed through the evolved packet core network. The second policy node is further configured to: (f) receive the policy session establishment message from the first policy node; and (g) send a policy session establishment acknowledgment message to setup the policy session with the first policy node. The system has the advantage in that it saves resources because the policy session is only established after determining that the user equipment is authorized to offload traffic in the fixed broadband access network.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings:

FIG. 3B-1 is a flowchart of a method implemented by the BPCF during the IP-CAN session establishment method shown in FIG. 3B in accordance with an embodiment of the present invention;

FIG. 3B-2 is a flowchart of a method implemented by the PCRF during the IP-CAN session establishment method shown in FIG. 3B in accordance with an embodiment of the present invention;

FIGS. 3E-1, 3E-2 and 3E-3 are signal flow diagrams associated with a document entitled "S2-12xxxx_Initial_Attach_merged_S2b_S2c-v3.doc" which discloses specific details of how one embodiment of the present invention can be used to improve the is teachings disclosed by 3GPP Specification TS 23.139 (V1.2.0; 2011-11)

DETAILED DESCRIPTION

Figure 2:
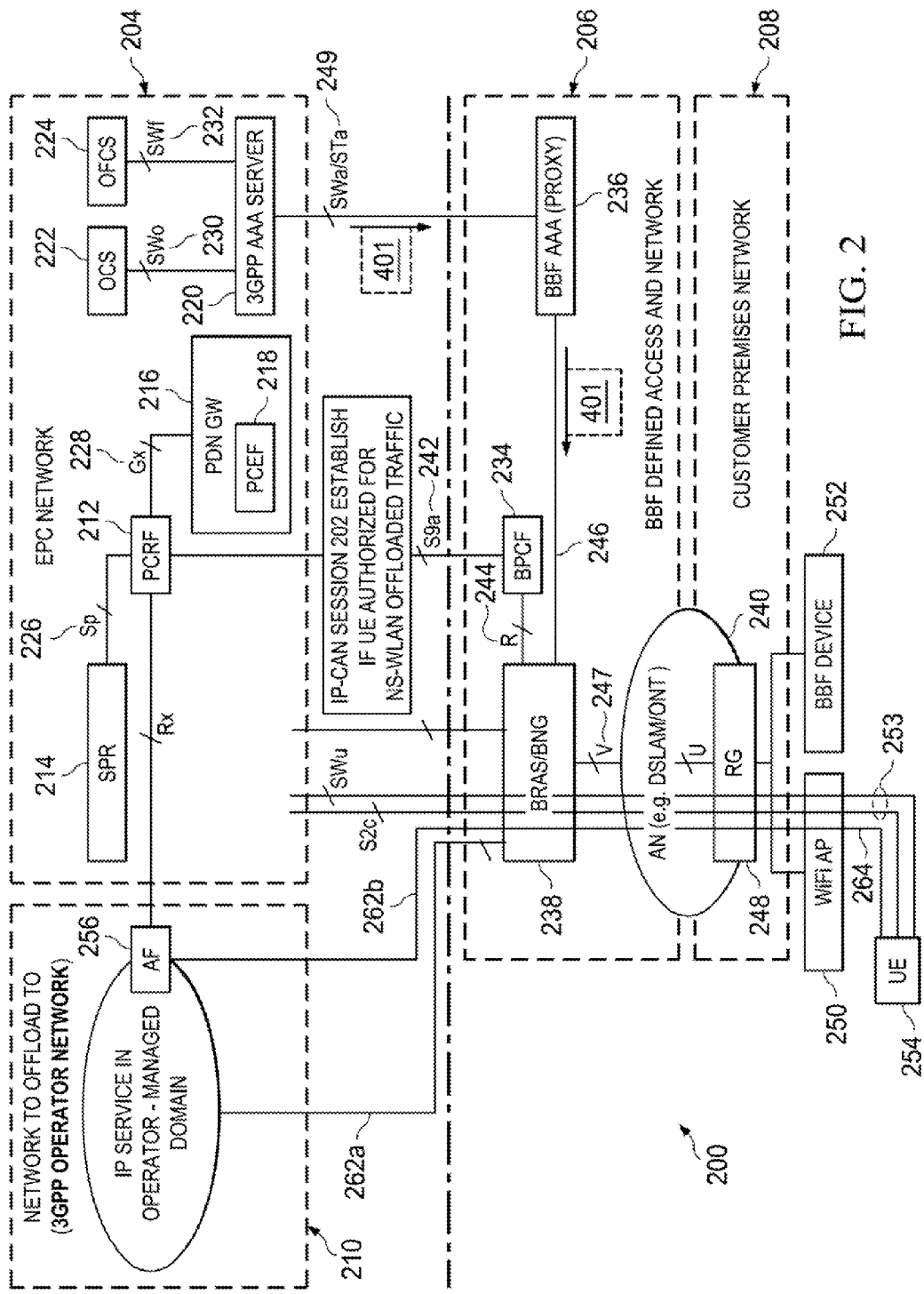
FIG. 2 is a basic diagram of an exemplary telecommunications architecture used to explain how the aforementioned problem which relates to the establishment of an IP-CAN session during the NS-WLAN offload scenario is solved in accordance with the present invention.

Referring to FIG. 2, there is a basic diagram of an exemplary telecommunications architecture 200 which used to explain how the aforementioned problem which relates to the establishment of an IP-CAN session 202 during the NS-WLAN offload scenario is solved in accordance with the present invention. The exemplary telecommunications architecture 200 includes an evolved packet core network 204 (EPC domain network 204), a fixed broadband access network 206 (BBF domain 206), a customer premises network 208, and a 3GPP operator network 210. The EPC domain network 204 includes a PCRF 212, a SPR 214, a PDN GW 216 (which incorporates a PCEF 218), a 3GPP AAA server 220, an OCS 222, and an OFCS 224. The PCRF 212 is coupled via a Sp interface 226 to the SPR 214 and further coupled via a Gx interface 228 to the PDN GW 216 (which incorporates the PCEF 218). The 3GPP AAA server 220 is coupled via a SWo interface 230 to the OCS 222 and further coupled via a SWf interface 232 to the OFCS 224. The fixed broadband access network 206 (BBF domain 206) includes a BPCF 234, a BBF AAA server 236, a BRAS/BNG 238, and an AN 240 (e.g., DSLAM 240, ONT 240). The BPCF 234 is coupled via a S9a interface 242 to the PCRF 212 and further coupled via a R interface 244 to the BRAS/BNG 238. The BRAS/BNG 238 is coupled via an interface 246 to the BBF AAA server 236 and further coupled via a V interface 247 to the AN 240. The BBF AAA server 236 is coupled via a SWa/STa interface 249 to the 3GPP AAA server 220. The customer premises network 208 includes a RG 248 which is coupled to the AN 240 and further coupled to a WiFi Access point 250 and a BBF device 252. The UE 254 is coupled to the WiFi Access point 250. The 3GPP operator network 256 includes an AF 258 which is coupled to an IP service in an operator managed domain 260 (e.g., Internet 260) and further coupled by one or more interfaces 262a and 262b to the BRAS/BNG 238. The exemplary telecommunications architecture 200 includes many other components but for clarity only the components relevant to the present invention have described herein. In this regard, a detailed discussion is provided next to explain how the aforementioned problem is solved by only establishing the IP-CAN session 202 after a determination is made to confirm that the UE 254 is authorized to offload traffic 264 during the NS-WLAN offload scenario in accordance with the present invention.

It is to be appreciated that, for simplicity, the architecture shown in FIG. 2 (as well as the one shown in FIG. 1) show only a Subscriber Profile Repository, SPR 214, as a subscriber data storage node belonging to the evolved packet core network 204 being contacted from the PCRF 212 via the illustrated "Sp" interface 226. However, another kind of subscriber data storage node belonging also to the evolved packet core network 204 can be envisaged, such as the so called User Data Repository, UDR. Namely, a UDR node can also store— in a similar manner as a SPR node 214—user data that can be used to determine—among other—whether a control session from the evolved packet core network 204 is to be established for a data session of a UE 254 connected to a fixed broadband network 206, wherein the data traffic of the UE 254 is to be offloaded via the fixed broadband network 206. In case of a UDR implementing the data storage node, the illustrated interface in FIG. 2 (and FIG. 1) between the PCRF 212 and the data storage node should be then the so called "Ud" interface (PCRF-UDR) instead of the illustrated "Sp" interface 226 (PCRF-SPR).

The following description describes methods and apparatuses wherein the establishment of the IP-CAN session 202 for provisioning of policy rules for offloaded traffic 264 is performed only if the UE 254 is authorized to perform NS-WLAN offload as is determined by the EPC operator and, in particular, as allowed by the component(s) in the EPC network domain 204. For clarity, one UE 254 is shown and described herein but it should be appreciated that multiple UEs that want to perform NS-WLAN offload can be supported and serviced by the present invention.

Two different solutions to the aforementioned problem are proposed and described herein. The first solution is based on the storage in the SPR 214 (or a UDR) within the 3GPP EPC network domain 204, and on a per subscriber basis, for the authorization to offload traffic 264 by the BBF domain 206 (see FIGS. 3A-3E). The second solution is based on the storage in the 3GPP AAA 220 within the 3GPP EPC network domain 204, and on a per subscriber basis, for the authorization to offload traffic 264 by the BBF domain 206 (see FIG. 4). In both solutions, the IP-CAN session 202 is established only after a determination is made to confirm that the UE 254 is authorized to offload traffic 264 during the NS-WLAN offload scenario. In these "on a per subscriber basis solutions", the user of the UE 254 can be identified by a subscriber identity associated with the UE 254 that identifies the user of said UE, such e.g. an IMSI. As opposed to user equipment's specific identifiers (such as a "International Mobile Equipment Identity", IMEI), the IMSI is—in essence—an identifier of a user not of a user equipment (UE 254). In particular, the IMSI reported by a UE (254) that connects to a telecommunications network (100, 200) identifies the user of said UE as a subscriber of at least part of said network.

Both solutions offer a marked improvement over the prior art in which the IP-CAN session was always established when the UE initially attached to the BBF domain.

For the first solution, the S9a interface 242 is evolved to establish the IP-CAN session 202 for offloaded traffic 264 only if the UE 254 is authorized to offload traffic 264, and the authorization decision is taken by the PCRF 212 within the 3GPP EPC network domain 204 based on the information stored by the SPR 214 (or UDR). The first solution is described in detail below with respect to FIGS. 3A-3E.

For the second solution, the SWa interface 249 between the AAA servers 220 and 236—respectively in the 3GPP EPC network domain 204 and the BBF domain 206—is evolved so as to allow the provision and authorization from the 3GPP EPC network domain 204 with respect to traffic 264 (e.g., NS-WLAN offloaded traffic 264) of the UE 254 connected to the BBF domain 206. In this particular case, the 3GPP AAA server 220 of the 3GPP EPC network domain 204 communicates with the BBF AAA server 236 in the BBF domain 206

(and eventually, to the BPCF 234 through the BNG 238 in the BBF domain 206) so as to determine whether the UE 254 connected to the BBF domain 206 is authorized to offload traffic 264 via the BBF domain 206. The second solution is described in detail below with respect to FIG. 4.

For both solutions, the IP-CAN session 202—between servers of the BBF domain 206 and the 3GPP EPC network domain 204—with respect to the UE 254 connected to the BBF domain 206 is established only if the UE 254 is authorized by the 3GPP EPC network domain 204 to perform traffic offload via the BBF domain 208.

Two different solutions are discussed in detail below as follows:

Section 1: Discloses the first solution based on the PCRF 212 authorizing the establishment of the IP-CAN session 202 for offloaded traffic 264.
  Section 2: Discloses the second solution based on the BPCF 234 requesting to establish the IP-CAN session 202 for offloaded traffic 264 when the UE 254 is authorized to perform offload.

Both solutions have in common that the establishment of the IP-CAN session 202 with respect to the traffic 264 of the UE 254 connected to the BBF domain 206 which can be offloaded by the BBF domain 206 is conditioned to the approval of entities within the 3GPP EPC network domain 204, and that a communication with respect to the IP-CAN session 202 can be established between policy nodes 212 and 234 residing respectively in these network domains (e.g. the BPCF 234 in the BBF domain 206 and the PCRF 212 in the 3GPP EPC network domain 204).

1. PCRF 212 Authorizing the Establishment of the IP-CAN Session 202 for Offloaded Traffic 264.

The BPCF 234 requests to establish an IP-CAN session 202 over the S9a interface 242 based on a trigger event (e.g., a message) received from an entity (e.g., from the BNG 238) in the fixed broadband access network 206. The trigger may be sent or received when the UE 254 is authenticated and the UE local IP address is assigned by the fixed broadband access (e.g., by the BBF AAA 236 or BNG 238) (e.g., see FIGS. 3A-3B's step 1). Alternatively, the BPCF 234 requests to establish an IP-CAN session 202 over the S9a interface 242 when it receives a trigger message from the PCRF 212 (e.g., see FIGS. 3C-3D's step 1).

Figure 3A:
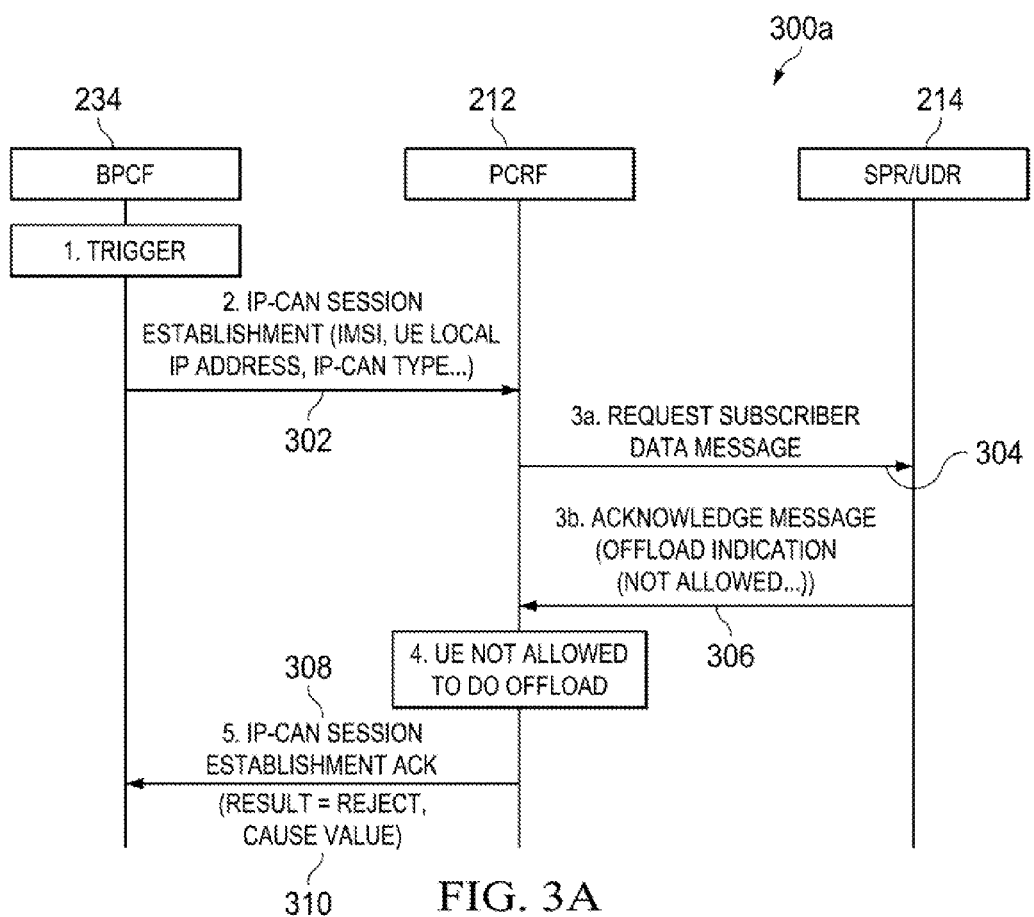
FIG. 3A is a signal flow diagram illustrating the IP-CAN session establishment method for offloaded traffic over the S9a interface when the UE is not allowed to do offload and the trigger is received by a BPCF from an entity in the fixed broadband access network in accordance with an embodiment of the present invention.
Figure 3B:
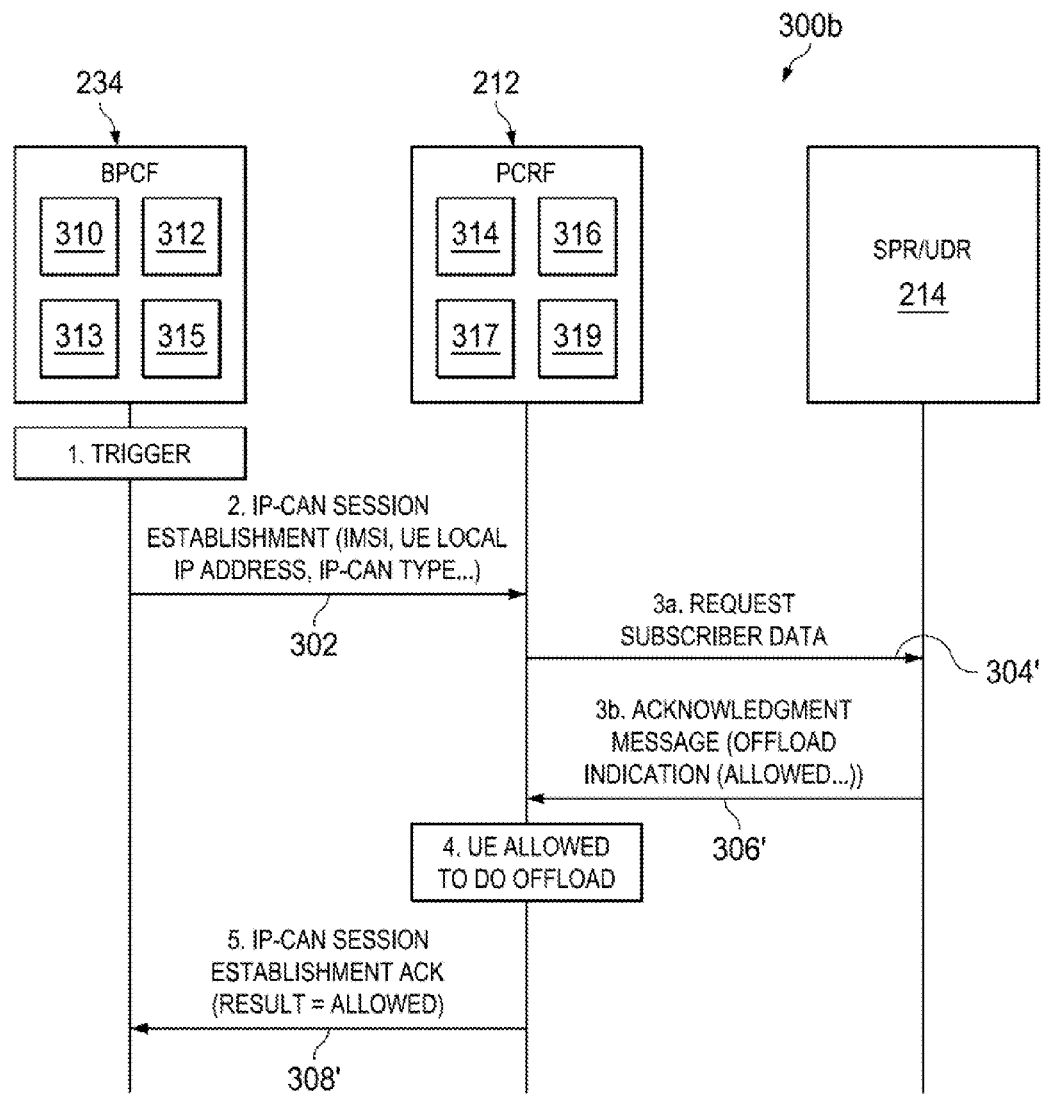
FIG. 3B is a signal flow diagram illustrating the IP-CAN session establishment method for offloaded traffic over the S9a interface when the UE is allowed to do offload and the trigger is received by a BPCF from an entity in the fixed broadband access network in accordance with an embodiment of the present invention.
Figures 1, 3B:
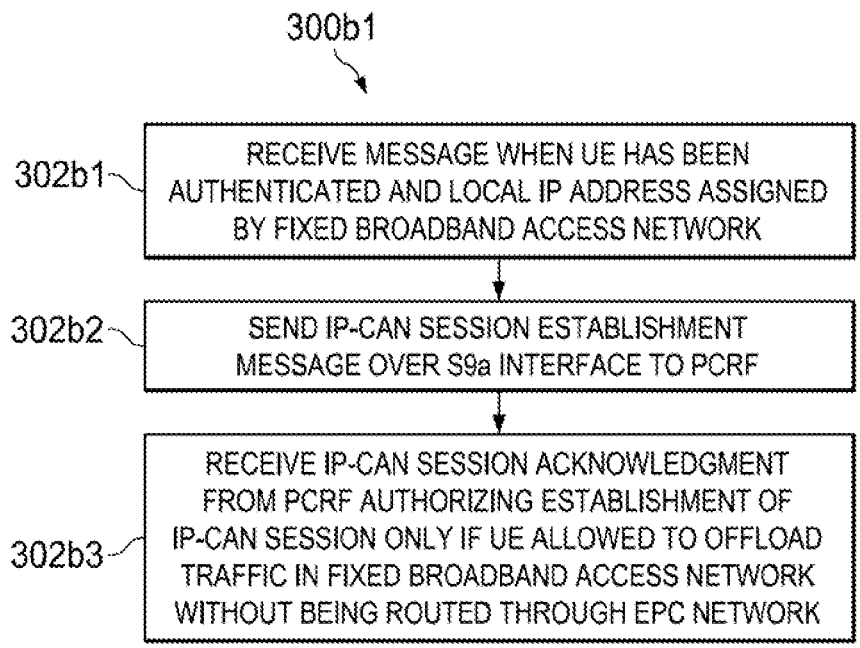
Figures 2, 3B:
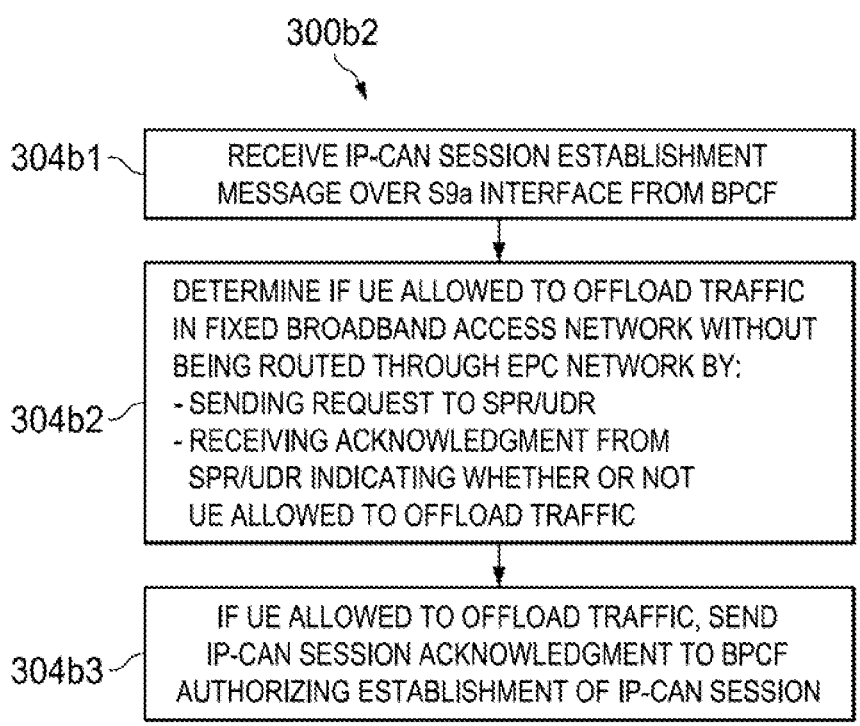

The SPR 214 (or UDR) stores information on whether an UE of a certain user (which can be identified by a subscriber identifier, such as an IMSI) is or is not allowed to perform NS-WLAN offload. The PCRF 212 can determine whether NS-WLAN offload is allowed or not depending on the authorization for offloaded traffic received from SPR 214 (or UDR). As discussed below, different cases and solutions are possible:

FIGS. 3A-3B: If the UE 254 is not allowed to perform NS-WLAN offload, then the PCRF 212 rejects the establishment of the IP-CAN session 202 to provision policy rules for offloaded traffic 264. The PCRF 212 may provide a cause value 310 that indicates that the request was rejected because the UE 254 was not allowed to perform NS-WLAN offload (see FIG. 3A). Otherwise, if the UE 254 is allowed to perform NS-WLAN offload, the PCRF 212 acknowledges the establishment of the IP-CAN session 202 for offloaded traffic 264 (see FIGS. 3B, 3E-1, 3E-2, and 3E-3).

Figure 3C:
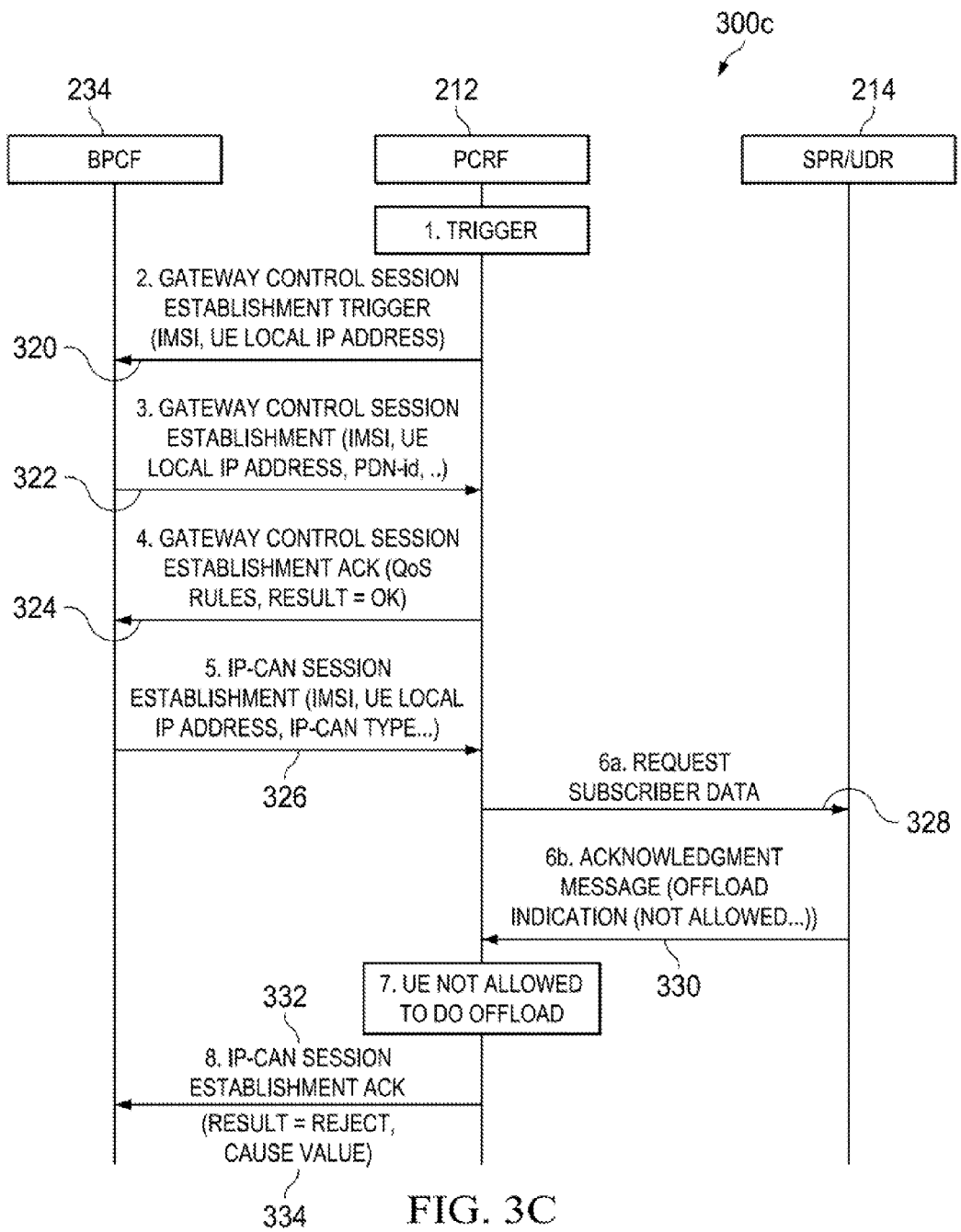
FIG. 3C is a signal flow diagram illustrating the IP-CAN session establishment method for offloaded traffic over the S9a interface when the UE is not allowed to do offload triggered by a PCRF within the EPC domain in accordance with an embodiment of the present invention.

FIG. 3C: If the UE 254 is not allowed to perform NS-WLAN offload, then the PCRF 212 rejects the establishment of the IP-CAN session 202 to provision policy rules for offloaded traffic 264. The PCRF 212 may provide a cause value 334 that indicates that the request was rejected due to that the UE 254 was not allowed to use offloaded traffic. Otherwise, if the UE 254 is allowed to perform NS-WLAN offload, the PCRF 212 acknowledges the establishment of the IP-CAN session 202 for offloaded traffic 264.

Figure 3D:
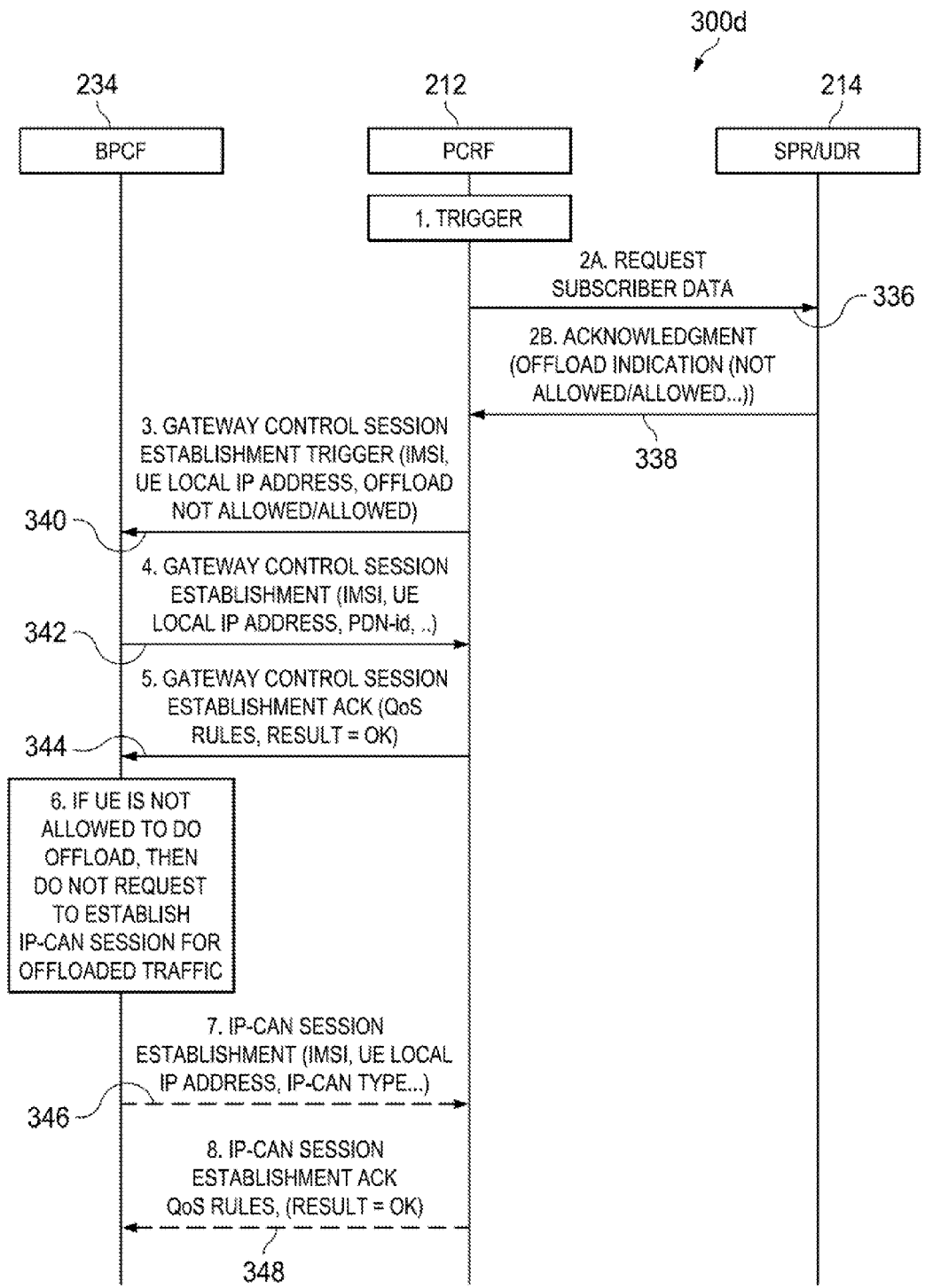
FIG. 3D is a signal flow diagram illustrating the IP-CAN session establishment method for offloaded traffic over the S9a interface when the UE is either allowed or not allowed to do offload triggered by a PCRF within the EPC domain in accordance with an embodiment of the present invention.
Figures 1, 3E:
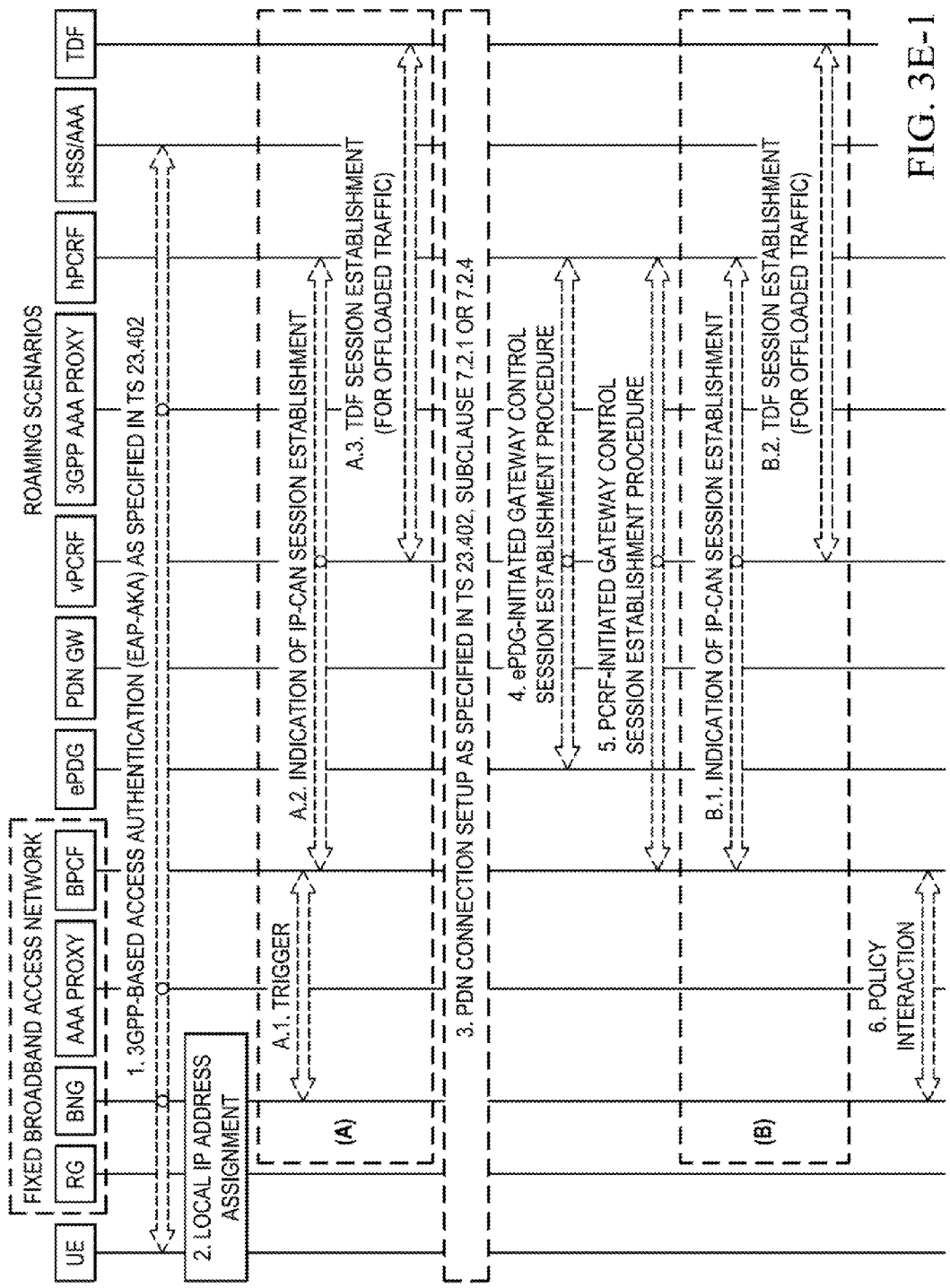
Figures 2, 3E:
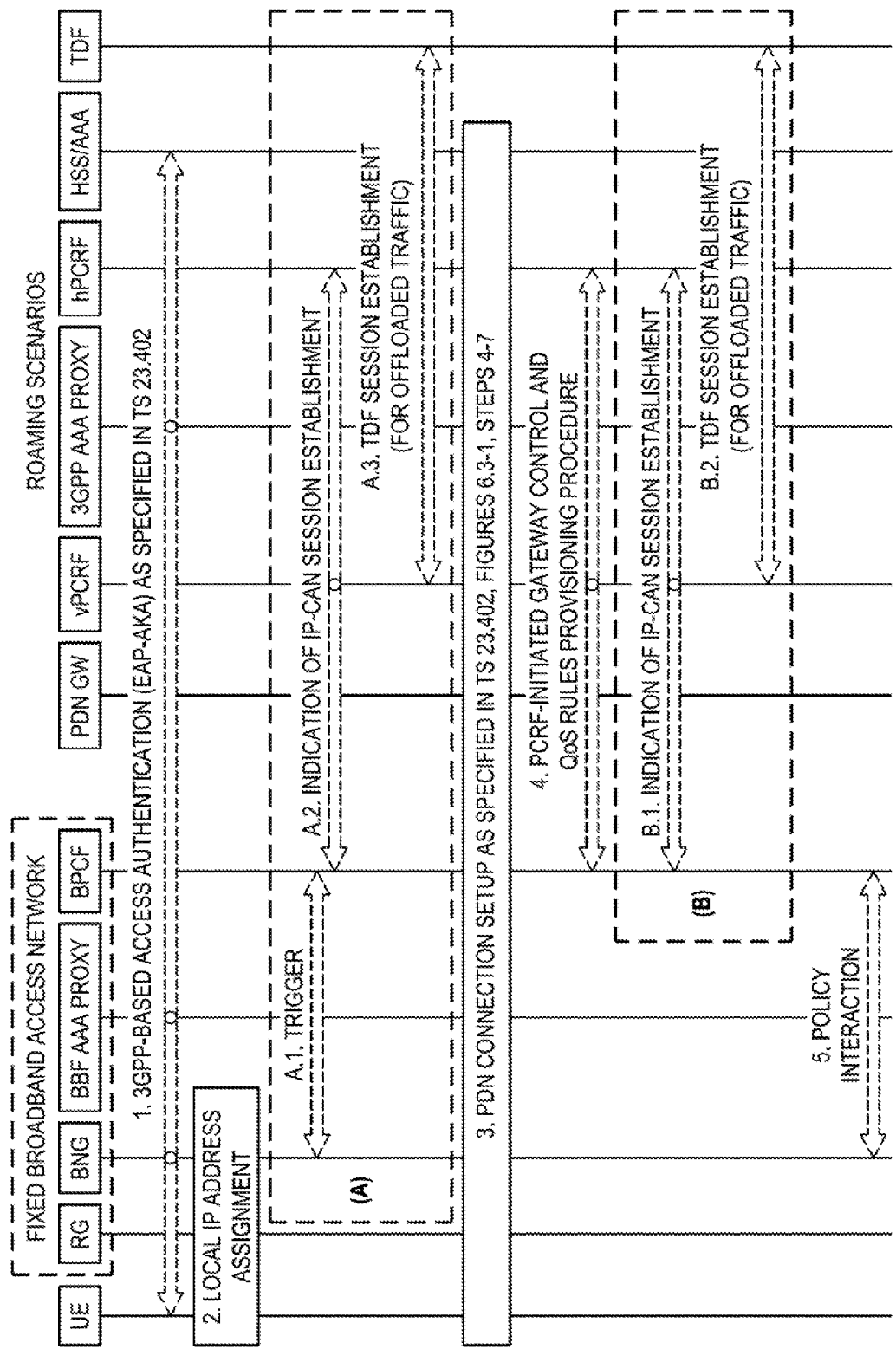
Figures 3, 3E:
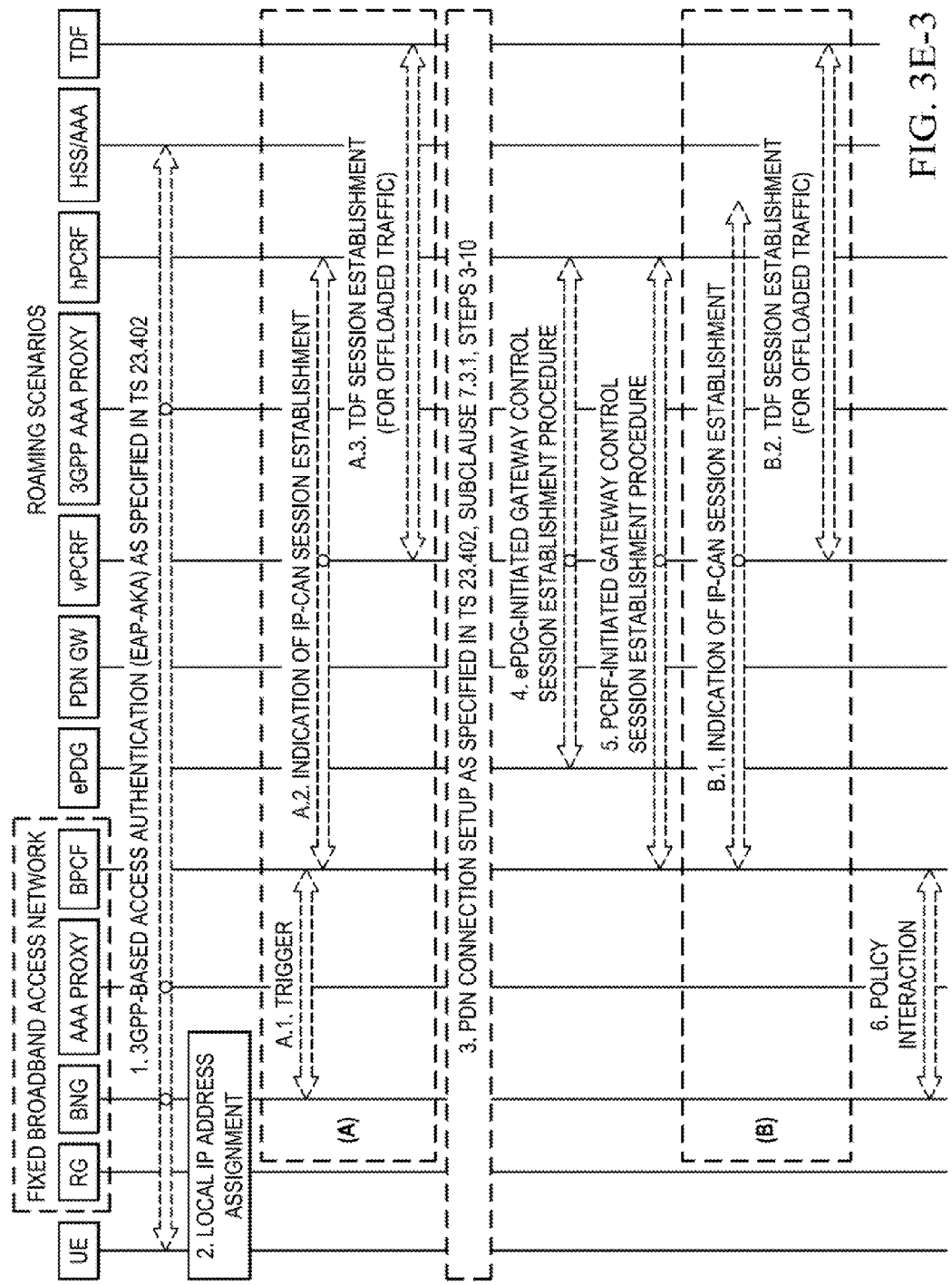

FIG. 3D (Variant I): If the UE 254 is allowed to perform NS-WLAN offload, the PCRF 212 indicates via the trigger message that NS-WLAN offload is allowed.

FIG. 3D (Variant II): If the UE 254 is not allowed to perform NS-WLAN offload, the PCRF 212 indicates via the trigger message that NS-WLAN offload is not allowed.

E. Combinations of FIG. 3D's Variants I and II are also possible.

Referring to FIG. 3A, there is a signal flow diagram illustrating the IP-CAN session establishment method 300a for offloaded traffic 264 over the S9a interface 242 when the UE 254 is not allowed to do offload and the trigger is received by the BPCF 234 from an entity in the fixed broadband access network 206 in accordance with an embodiment of the present invention. In this example, the BPCF 234 at step 1 is notified that the UE 254 is attached via fixed broadband access (e.g. by the BBF AAA 236 or BNG 238). At step 2, the BPCF 234 sends the PCRF 212 an IP-Can Session Establishment message 302 (including e.g.: the IMSI of UE 254, the local IP address of UE 254, IP-CAN type) to establish an IP-CAN session 202 over the S9a interface 242 for NS-WLAN offloaded traffic 264 associated with the UE 254. At step 3a, the PCRF 212 sends a request subscriber data message 304 (e.g., comprising an identifier (e.g., an IMSI) of the user of the UE 254) to the SPR 214 (or UDR). At step 3b, the SPR 214 (or UDR) sends an acknowledgment 306 indicating in this example that the UE 254 is not allowed to perform NS-WLAN offload. Therefore, in steps 3a-3b subscriber data associated with the user of the UE are retrieved (e.g. data stored by the SPR or UDR in relationship with the IMSI associated to the UE). At step 4, the PCRF 212 determines that the UE 254 is not allowed to perform NS-WLAN offload. At step 5, the PCRF 212 sends an IP-CAN Session Establishment Acknowledgment 308 to the BPCF 234 indicating that the establishment of the IP-CAN session 202 to provision policy rules for offloaded traffic in this example has been rejected. The PCRF 212 may provide a cause value 310 in the IP-CAN Session Establishment Acknowledgment 308 where the cause value 310 indicates that the request 302 was rejected due to that the UE 254 was not allowed to use offloaded traffic 264. The subscriber data in steps 3a and 3b, step 4 and the result code in step 5 are all new when compared with the description in current 3GPP TR 23.839's clause 6.3.1. If the UE 254 is allowed to perform NS-WLAN offload, then the PCRF 212 acknowledges the establishment of the IP-CAN session 202 for offloaded traffic 264 as discussed next with respect to FIG. 3B.

Referring to FIG. 3B, there is a signal flow diagram illustrating the IP-CAN session establishment method 300b for offloaded traffic 264 over the S9a interface 242 when the UE 254 is allowed to do offload and the trigger is received by the BPCF 234 from an entity in the fixed broadband access network 206 in accordance with an embodiment of the present invention. In this example, the BPCF 234 at step 1 is notified that the UE 254 is attached via fixed broadband access (e.g. by the BBF AAA 236 or BNG 238). At step 2, the BPCF 234 sends the PCRF 212 an IP-Can Session Establishment message 302 (including e.g.: the IMSI of UE 254, the local IP address of UE 254, IP-CAN type) to establish an IP-CAN session 202 over the S9a interface 242 for NS-WLAN offloaded traffic 264. At step 3a, the PCRF 212 sends a request subscriber data message 304 (e.g., comprising an identifier (e.g., an IMSI) of the user of the UE 254) to the SPR 214 (or UDR). At step 3b, the SPR 214 (or UDR) sends an acknowledgment 306' indicating in this example that the UE 254 is allowed to perform NS-WLAN offload. Therefore, in steps 3a-3b subscriber data associated with the user of the UE are retrieved (e.g. data stored by the SPR or UDR in relationship with the IMSI associated to the UE). At step 4, the PCRF 212 determines that the UE 254 is allowed to perform NS-WLAN offload. At step 5, the PCRF 212 sends an IP-CAN Session Establishment Acknowledgment 308' to the BPCF 234 indicating that the establishment of the IP-CAN session 202 to provision policy rules for offloaded traffic has been allowed. The subscriber data in steps 3a and 3b, step 4 and the result code in step 5 are all new when compared with the description in current 3GPP TR 23.839's clause 6.3.1.

Figure 1:
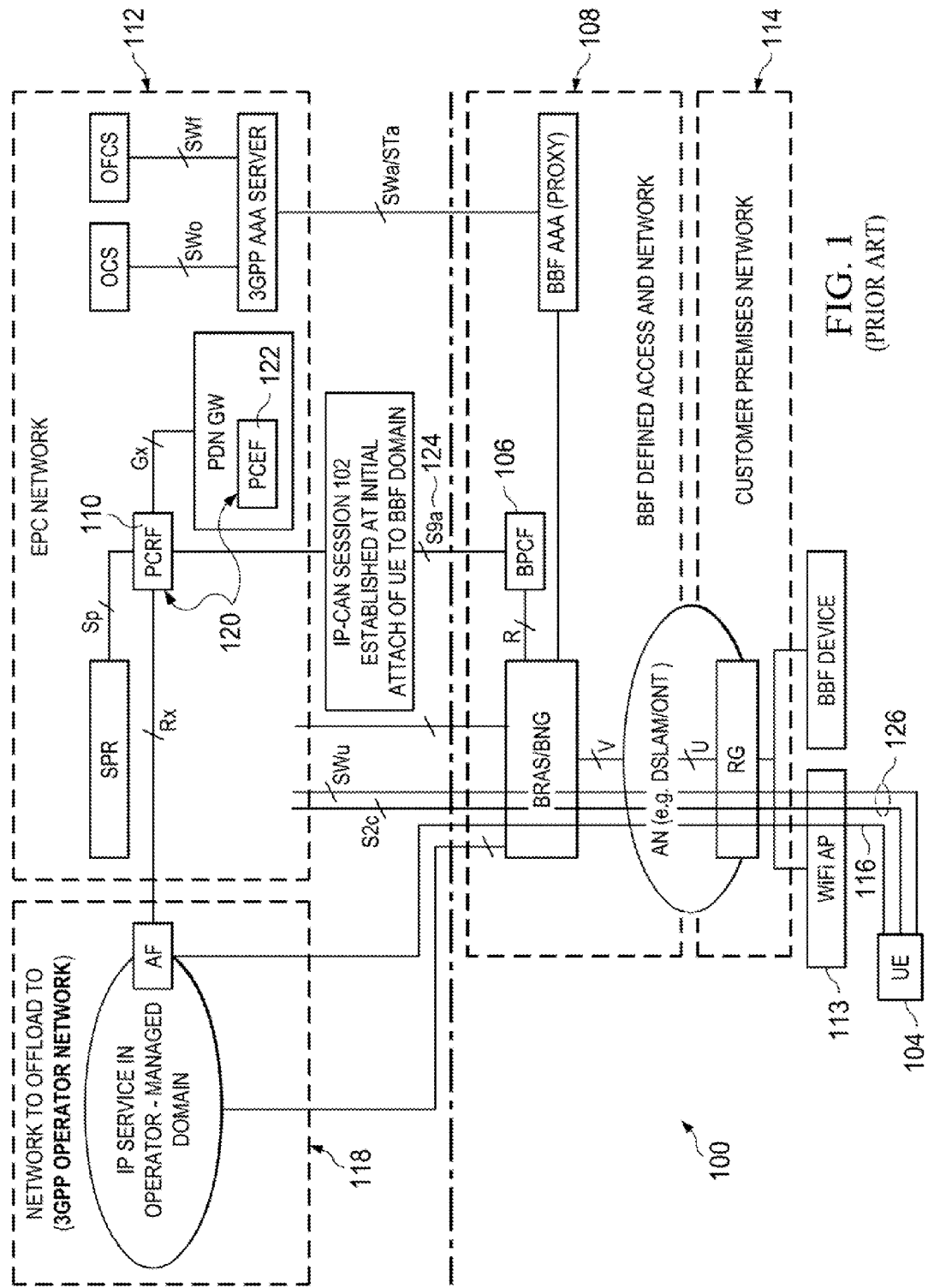
FIG. 1 (PRIOR ART) is a basic diagram of a traditional telecommunications architecture used to explain a problem that occurs during a NS-WLAN offload scenario and in particular the problem relates to the establishment of an IP-CAN session for the UE between a BPCF which is associated with a BBF domain and a PCRF which is associated with an EPC domain.

Referring to FIG. 3B-1, there is illustrated a flowchart of a method 300b1 implemented by the BPCF 234 during the IP-CAN session establishment method 300b in accordance with an embodiment of the present invention. The BPCF 234 has a variety of hardware components including at least a processor 310, a memory 312, an input interface 313, and an output interface 315 (see FIG. 3B). In this case, the processor 310 would interface with the memory 312 and execute computer-readable instructions stored therein to perform the following steps 302b1, 302b2 and 302b3. At step 302b1, the BPCF 234 would receive a message when the UE 254 has been authenticated and an local IP address has been assigned by the fixed broadband access network 206 (see FIG. 3B's step 1). At step 302b2, the BPCF 234 would send the IP-CAN session establishment message 302 over the S9a interface 242 to the PCRF 212 (see FIG. 3B's step 2). The IP-CAN session 202 requested to established is with respect to traffic 264 of the UE 254 connected to the fixed broadband access network 206 that is to be offloaded by the fixed broadband access network 206 without being routed through the evolved packed core network 204. At step 302b3, the BPCF 234 would receive the IP-CAN session establishment acknowledgment message 308' from the PCRF 212 (see FIG. 3B's step 5b). In this case, the IP-CAN Session Establishment Acknowledgment 308' authorizes an establishment of the IP-CAN session 202 over the S9a interface 242 for offloaded traffic 264. In particular, the BPCF 234 would receive the IP-CAN session establishment acknowledgement message 308' only if the PCRF 212 determines that the UE 254 is allowed to offload traffic 264 in the fixed broadband access network 206 without being routed through the EPC network 204.

Referring to FIG. 3B-2, there is illustrated a flowchart of a method 300b2 implemented by the PCRF 212 during the IP-CAN session establishment method 300b in accordance with an embodiment of the present invention. The PCRF 212 has a variety of hardware components including at least a processor 314, a memory 316, an input interface 317, and an output interface 319 (see FIG. 3B). In this case, the processor 314 would interface with the memory 316 and execute computer-readable instructions stored therein to perform the following steps 304b1, 304b2 and 30463. At step 304b1, the PCRF 212 would receive the IP-CAN session establishment message 302 over the S9a interface 242 from the BPCF 234 (see FIG. 3B's step 2). The IP-CAN session 202 requested to be established is with respect to traffic 264 of the UE 254 connected to the fixed broadband access network 206 that is to be offloaded by the fixed broadband access network 206 without being routed through the evolved packed core network 204. At step 304b2, the PCRF 212 determines if the UE 254 is allowed to offload traffic 264 in the fixed broadband access network 206 without being routed through the EPC network 204. For instance, the PCRF 212 can perform step 304b2 by sending a request 304' (request subscriber data 304')

(e.g., comprising an identifier (e.g., an IMSI) of the user of the UE 254) to the SPR 214 (or UDR) and receiving an acknowledgment 306' from the SPR 214 (or UDR) indicating whether or not the UE 254 is allowed to perform NS-WLAN offload (e.g. see FIG. 3B's steps 3a and 3b). At step 304b3, the PCRF 212 upon determining the UE 254 is allowed to offload traffic 264 in the fixed broadband access network 206 without being routed through the EPC network 204 sends the IP-CAN session establishment acknowledgment message 308' to the BPCF 234 (see FIG. 3B's step 5). The IP-CAN session establishment acknowledgement message 308' authorizes an establishment of the IP-CAN session 202 over the S9a interface 242 for the UE's offloaded traffic 264.

Referring to FIG. 3C, there is a signal flow diagram illustrating the IP-CAN session establishment method 300c for offloaded traffic 264 over the S9a interface 242 when the UE 254 is not allowed to do offload and the trigger is received by the PCRF 212 in accordance with an embodiment of the present invention. In this example, the PCRF 212 at step 1 receives an indication of IP-CAN session establishment over the Gx interface 228 from the PDN GW 218 which triggers the establishment of a Gateway Control Session over the S9a interface 242 as described per steps 2-4. At step 2, the PCRF 212 sends a Gateway Control Session Establishment Trigger message 320 (including e.g.: the IMSI of UE 254, and the local IP address of the UE 254) to the BPCF 234. At step 3, the BPCF 234 sends a Gateway Control Session Establishment message 322 (including e.g.: the IMSI of UE 254, and the local IP address of the UE 254, the PDN-Id) to the PCRF 212. At step 4, the PCRF 212 sends a Gateway Control Session Establishment Acknowledgment message 324 (including at least the QoS rules, and result=OK indicator) to the BPCF 234. At step 5, the BPCF 234 sends the PCRF 212 an IP-Can Session Establishment message 326 (including e.g.: the IMSI of UE 254, the local IP address of UE 254, IP-CAN type) to establish the IP-CAN session 202 over the S9a interface 242 for NS-WLAN offloaded traffic 264 associated with the UE 254. At step 6a, the PCRF 212 sends a request subscriber data message 328 (e.g., comprising an identifier (e.g., an IMSI) of the user of the UE 254) to the SPR 214 (or UDR). At step 6b, the SPR 214 (or UDR) sends an acknowledgment 330 indicating in this example that the UE 254 is not allowed to perform NS-WLAN offload. At step 7, the PCRF 212 determines that the UE 254 is not allowed to perform NS-WLAN offload. At step 8, the PCRF 212 sends an IP-CAN Session Establishment Acknowledgment 332 to the BPCF 234 indicating that the establishment of the IP-CAN session 202 to provision policy rules for offloaded traffic has been rejected. The PCRF 212 may provide a cause value 334 in the IP-CAN Session Establishment Acknowledgment 332 where the cause value 334 indicates that the request in IP-Can Session Establishment message 326 was rejected due to that the UE 254 was not allowed to use offloaded traffic 264. The subscriber data in steps 6a and 6b, step 7 and the result code in step 8 are all new when compared with the description in current 3GPP TR 23.839's clause 6.3.1. In particular, subscriber data associated with the user of the UE 254 (e.g. data related to the IMSI associated to the UE) are retrieved in steps 6a and 6b. If, according to subscriber data associated with the UE 254, the UE 254 is allowed to perform NS-WLAN offload, then the PCRF 212 would acknowledge the establishment of the IP-CAN session 202 for offloaded traffic 264 in the IP-CAN Session Establishment Acknowledgment 332.

Referring to FIG. 3D, there is a signal flow diagram illustrating the IP-CAN session establishment method 300d for offloaded traffic 264 over the S9a interface 242 when the UE 254 is either allowed or not allowed to do offload triggered by the PCRF 212 within the EPC domain 204 in accordance with an embodiment of the present invention. In this example, the PCRF 212 at step 1 receives an indication of IP-CAN session establishment over the Gx interface 228 from the PDN GW 218 which triggers the retrieval of subscriber data associated with the user of the UE 254 per steps 2a-2b (e.g. data related to the IMSI associated to the UE). At step 2a, the PCRF 212 sends a request subscriber data message 336 to the SPR 214 (or UDR). At step 2b, the SPR 214 (or UDR) sends an acknowledgment 338 indicating whether or not the UE 254 is allowed or not allowed to perform NS-WLAN offload (in this example the UE 254 is allowed to perform NS-WLAN offload). As a result, the PCRF 212 knows that the UE 254 in this example is allowed to to perform NS-WLAN offload. At step 3, the PCRF 212 sends a Gateway Control Session Establishment Trigger message 340 (including e.g.: the IMSI of UE 254, and the local IP address of the UE 254, offload: not allowed/allowed—in this example allowed) to the BPCF 234. At step 4, the BPCF 234 sends a Gateway Control Session Establishment message 342 (including e.g.: the IMSI of UE 254, and the local IP address of the UE 254, the PDN-Id) to the PCRF 212. At step 5, the PCRF 212 sends a Gateway Control Session Establishment Acknowledgment message 344 (including at least the QoS rules, and result=OK indicator) to the BPCF 234. At step 6, the BPCF 234 based on the received Gateway Control Session Establishment Trigger message 340 knows whether or not the UE 254 is allowed to perform NS-WLAN offload. In the event, the UE 254 is not allowed to perform NS-WLAN offload then the BPCF 234 would not perform step 7. However, in this example the UE 254 is allowed to perform NS-WLAN offload so the BPCF 234 sends the PCRF 212 an IP-Can Session Establishment message 346 (including e.g.: the IMSI of UE 254, the local IP address of UE 254, IP-CAN type) to establish an IP-CAN session 202 over the S9a interface 242 for NS-WLAN offloaded traffic 264. At step 8, the PCRF 212 sends an IP-CAN Session Establishment Acknowledgment 348 (including QoS rules, and result indicator=OK) to the BPCF 234 indicating that the establishment of the IP-CAN session 202 to provision policy rules for offloaded traffic in this example has been made. The new information element in steps 2 and 3 and step 6 are new compared when compared with the description in current 3GPP TR 23.839's clause 6.3.1.

1.1 First Solution's Features

In the first solution, the existing PCC architecture (which includes the PCRF 212 and the PCEF 218) is reused to perform authorization of policies for offloaded traffic 264. The PCRF 212 would indicate to the BPCF 234 if policy rules for offloaded traffic 264 from the UE 25 are to be provided or not. This could be based on:

A. The indication over the Gx interface 228 that the UE 254 has accessed EPC via Fixed Broadband Access which can be used to trigger the interaction between the PCRF 212 and the SPR 214 to check if the UE 254 is allowed to offload traffic 264 in the fixed broadband access network 206.

B. The SPR 214 (or UDR) maintains subscriber authorization to perform offload in the fixed broadband access network 206 (BBF network domain 206).

C. The PCRF 212 would send the BPCF 234 an indication of whether policies for offloaded traffic 264 can be requested for the UE 254 over the S9a reference point 242.

If policies cannot be downloaded then the PCRF 212 may also send an indication to the BPCF 234 on how traffic for the particular UE 254 from the assigned UE local IP address is to be handled by the fixed broadband access network 206. For example, the PCRF 212 may indicate that NS-WLAN offload is not allowed. Alternatively the PCRF 212 may send an indication that NS-WLAN offload for this particular UE 254 is allowed but is not subject to policy control by the PCRF 212. For instance, these indications could be provided via the aforementioned Gateway Control Session Establishment Trigger message 320 and 340 or the IP-CAN Session Establishment Acknowledgment message 308, 308', 332 and 348.

1.2 First Solution's Amendments to 3GPP TS 23.139 (V1.2.0; 2011-11)

The following is associated with a document entitled "S2-12xxxx_Initial_Attach_merged_S2b_S2c-v3.doc" which discloses specific details of the first solution described above in the way of improvements to the aforementioned current 3GPP Specification TS 23.139 (V1.2.0; 2011-11). This document specifies features to be implemented by servers of the BBF domain 206 and of the 3GPP EPC domain 204 in an interworking scenario as the one studied by the aforementioned 3GPP TR 23.839 (V1.4.1) (2011-12). The document is as follows:

Discussion

This document proposes to update the information flows for initial attach to show when to create the IP-CAN session to provision QoS Rules for NS-WLAN offloaded traffic and to remove the BPCF-Initiated Gateway Control Session Establishment from the attach information flow.

1—When to establish an IP-CAN session to provision QoS Rules for NS-WLAN offloaded traffic.

When 3GPP based authentication is performed and the UE is assigned a UE local IP address, the BPCF triggers the indication that an IP-CAN session is established for NS-WLAN offloaded traffic including an identifier of the user of the UE, such as the IMSI, and the UE local IP address in the request.

2—The Gateway Control Session over S9a is used to provision QoS Rules for EPC routed traffic. Therefore it can be triggered when the UE sets up a S2b/S2c tunnel and triggered by the establishment of the Gx for the case of S2b-GTP or trusted S2c; or by the establishment of Gxb* session for the case of S2b-PMIP or untrusted S2c.

Proposal 7.2 Initial Attach

This clause specifies the additional procedures for the UE's initial attachment to a Fixed Broadband access network via PMIPv6 or GTPv2 based S2b interface, for the UE to establish the first PDN connection over the Fixed Broadband Access with S2b, or for the UE to have only offloaded traffic via Fixed Broadband Access.

NOTE 1: It is up to stage 3 to optimize S9a procedures for Non-Seamless WLAN offloaded traffic and EPC routed traffic handled by the same PCRF.

This procedure establishes a session between the BPCF and the PCRF to provision policy decisions (i.e. QoS Rules) for NS-WLAN offloaded traffic or to provision policy decisions (i.e. QoS Rules) for EPC routed traffic.

FIG. 7.2-1: Initial Attachment (See FIG. 3E-1 in this Document)

NOTE: The Step 4 is not proxied

If dynamic policy provisioning over S9a is not deployed the optional steps (A) or (B) and steps 4-5 do not occur. Instead, the Fixed Broadband Access Network may employ local policies.

For NS-WLAN offloaded traffic, the IP session for the UE in Fixed Broadband Access is handled as an IP-CAN session by the PCRF. For EPC-routed traffic, the IP-CAN session for the PDN Connection in the PDN GW is created via Gx procedures. In addition, a Gateway Control Session is established between the BPCF and the PCRF corresponding to the EPC-routed IP-CAN session in the PCRF. Policy interworking via S9a for NS-WLAN offloaded traffic in this release is supported for scenarios without NAT in the BBF domain. The PCRF discovery function may select different PCRFs for each PDN connection for the UE in the PDN GW and for the IP session for the UE in the Fixed Broadband Access. There may be multiple TDFs deployed; the TDF selected for the IP session for the UE in the Fixed Broadband Access and for the EPC routed traffic may or may not be the same TDF.

If 3GPP based authentication is supported by BBF network, and if the UE proceeds only with NS-WLAN offloaded traffic, then only steps 1 to A.3 will be performed.

1. The UE may perform the 3GPP based (EAP) access authentication procedure involving the Fixed Broadband Access network as specified in TS 23.402 [3] clause 7.2.1 step 1. As part of this step, the permanent user identity (IMSI) is provided from the 3GPP AAA Server to the Fixed Broadband Access network.
2. The UE receives a local IP address from the Fixed Broadband Access Network. How this is done is out of 3GPP scope, but it may involve IP address assignment by an RG or a BNG.

A: The steps in (A) describe PCC signalling to provision policies for NS-WLAN offloaded traffic and are only triggered when the BPCF receives the IMSI and the BBF allocated UE local IP address.

A1. Triggered by steps 1 and 2, the BPCF is informed about the UE accessing over Fixed Broadband Access. How this is done is out of 3GPP scope.

A2. When the BPCF receives the trigger and policy interworking with PCRF is supported, the BPCF sends an indication of IP-CAN session establishment for NS-WLAN offloaded traffic as specified in TS 23.203 [4]. The BPCF includes the IMSI, IP-CAN type and UE local IP address in the message to the PCRF. The IP-CAN session for NS-WLAN offloaded traffic is established only if the UE is allowed to perform NS-WLAN offload, this is indicated by the PCRF to the BPCF as par of the IP-CAN session establishment procedure.

A3. Triggered by the successful establishment of the IP-CAN session for the UE local IP address in step A2, the V-PCRF (roaming) and the PCRF (non-roaming) may establish a session with the TDF to provision ADC Rules for that UE local IP address (if applicable and when solicited service mode applies).

3. The description of the PDN connection setup procedure is the same as for steps 2-9 in TS 23.402 [3], clause 7.2.1 or for steps A.1-E.1 in TS 23.402 [3] clause 7.2.4, with the following additions: The UE local IP address and optionally UDP source port number (if NAT is detected) are also included in the Create Session Request message. The UE local IP address and optionally UDP source port number (if NAT is detected) are forwarded to the PCRF in IP-CAN Session Establishment procedure, if received in the Create Session Request Message.

The steps in 4 and 5 describe PCC signalling to provision policies for EPC routed traffic. Step 4 is only applicable when S2b PMIPv6 is used.

4. Triggered by the IKEv2 tunnel establishment in step 3, the ePDG initiates Gxb* session establishment with the PCRF by using Gateway Control Session establishment procedure as specified in TS 23.203 [4]. The ePDG includes the IMSI, APN, IP-CAN type, UE IP address allocated by EPC, the UE local IP address and optionally UDP source port number (if NAT is detected).

5. This step may be triggered by step 3 or step 4.

When triggered by step 3, the PCRF (for non-roaming case), the V-PCRF (for visited access) or the H-PCRF (for home routed) initiates Gateway Control Session establishment with the BPCF. The V-PCRF (for visited access) proxies the Gateway Control Session Establishment the IMSI, IP-CAN type, UE IP address needs to be included in the request message to the H-PCRF.

When triggered by step 4, the PCRF (for non-roaming case) and the V-PCRF (for home routed and visited access roaming case) initiates Gateway Control Session establishment with the BPCF. The V-PCRF (for visited access and home routed) sends the Gateway Control Session Establishment the IMSI, IP-CAN type, UE IP address needs to be included in the request message to the H-PCRF.

B: The steps in (B) describe PCC signalling to provision policies for NS-WLAN offloaded traffic and are only triggered when the BPCF receives the IMSI and the BBF allocated UE local IP address in step 5. Steps in (B) are only performed in case the steps in (A) were not performed B1: This step is the same as step (A2) above B2. This step is the same as step (A3) above.

6. The BPCF may interact with the BNG, e.g. to download policies, as defined by Fixed Broadband Access Policy Framework specifications BBF WT-134 [11] and BBF WT-203 [6]. This step is out of 3GPP scope.

8 Functional Description and Procedures for Fixed Broadband Access Network Over S2c 8.1 Introduction The description for the PCC procedures applicable for S2c untrusted and trusted scenarios including the NS-WLAN offloaded traffic. The IP session for the UE in Fixed Broadband Access is handled as an IP-CAN session by the PCRF. For EPC-routed traffic, the IP-CAN session for the PDN Connection in the PDN GW is created via Gx procedures. In addition a Gateway Control Session is established between the BPCF and the PCRF corresponding to the EPC-routed IP-CAN session in the PCRF.

NOTE 1: It is up to stage 3 to optimize S9a procedures for Non-Seamless WLAN offloaded traffic and EPC routed traffic handled by the same PCRF.

Policy interworking via S9a for NS-WLAN offloaded traffic in this release is supported for scenarios without NAT in the BBF domain.

The PCRF discovery function may select different PCRFs for each PDN connection for the UE in the PDN GW and for the IP session for the UE in the Fixed Broadband Access. There may be multiple TDFs deployed, the TDF selected for the IP session for NS-WLAN offloaded traffic and for the EPC routed traffic may or may not be the same TDF. The home routed roaming, LBO and non-roaming scenarios are depicted in the figure.

In the LBO case, the 3GPP AAA Proxy acts as an intermediary, forwarding messages from the 3GPP AAA Server in the HPLMN to the PDN GW in the VPLMN and visa vice versa. Messages between the PDN GW in the VPLMN and the hPCRF in the HPLMN are forwarded by the vPCRF in the VPLMN.

In the non-roaming case, the vPCRF and the 3GPP AAA Proxy are not involved.

8.2 Procedures for Trusted Fixed Broadband Access Network Over S2c 8.2.1 Initial Attach with DSMIPv6 on S2c to Trusted Fixed Broadband Access This clause specifies the additional procedures for the UE's initial attachment to Fixed Broadband Access which is considered a trusted access to EPC, for the UE to establish the first PDN connection over the Fixed Broadband Access with S2b, or for the UE to have only the offloaded traffic via Fixed Broadband Access.

This procedure establishes a session between the BPCF and the PCRF to provision policy decisions (i.e. QoS Rules) for NS-WLAN offloaded traffic or to provision policy decisions (i.e. QoS Rules) for EPC routed traffic.

FIG. 8.2.1-1: Initial Attachment (See FIG. 3E-2 in this Document)

If dynamic policy provisioning over S9a is not deployed, the optional steps (A), (B) and 4 do not occur. Instead, the Fixed Broadband Access Network may employ BBF Local policies.

Depending on scenario, either the steps shown in (A) or the steps in (B) are preformed as described in subclause 7.2-1.

1. The description of this step is the same as subclasue 7.2 step 1.
2. The description of this step is the same as subclasue 7.2 step 2. The UE local IP address is used as CoA in S2c signalling.
A: The steps in (A) from A.1 to A.3 are the same as subclause 7.2 step (A) from step A.1 to step A.3 and describe PCC Signalling for NS-WLAN offloaded traffic.
3. The description of this step is the same as for steps 4-7 in TS 23.402 [3], clause 6.3, with the following information: The UE local IP address (i.e. CoA) and optionally UDP source port number of the DSMIPv6 binding update signalling (if NAT is detected) are forwarded to the PCRF in step 6 of TS 23.402 [3], clause 6.3 (i.e. IP-CAN session establishment procedure).
The step in 4 PCC signalling to provision policies for EPC routed traffic.
4. The description of this step is the same as subclasue 7.2 step 4. The UE local IP address is used as CoA in S2c signalling.
B: The steps in (B) from B.1 to B.2 are the same as subclause 7.2 step (B) from step B.1 to step B.2 and describe PCC Signalling for NS-WLAN offloaded traffic.
5. The description of this step is the same as subclause 7.2 after step 5.

8.3 Procedures for Untrusted Fixed Broadband Access Network Over S2c 8.3.1 Initial Attach with DSMIPv6 on S2c to Untrusted Fixed Broadband Access This clause is related to the case when the UE attaches to a Fixed Broadband Access which is considered untrusted. In this case only S2c procedures can be used. when the UE establishes the first PDN connection over the Fixed Broadband Access with S2b, or when the UE has only the offloaded traffic via Fixed Broadband Access.

This procedure establishes a session between the BPCF and the PCRF to provision policy decisions (i.e. QoS Rules) for NS-WLAN offloaded traffic or to provision policy decisions (i.e. QoS Rules) for EPC routed traffic.

FIG. 8.3.1-1: Initial Attachment (See FIG. 3E-3 in this Document)

NOTE: The Step 4 is not proxied.

If dynamic policy provisioning over S9a is not deployed, the optional steps (A) or (B) and 4-5 as described in subclause 7.2.1.

1. The description of this step is the same as subclasue 7.2 step 1
2. The description of this step is the same as subclasue 7.2 step 2. The UE local IP address is used as CoA in S2c signalling.
A: The steps in (A) from A.1 to A.3 are the same as subclause 7.2 step (A) from step A.1 to step A.3 and describe PCC Signalling for NS-WLAN offloaded traffic.
3. The description of the PDN connection setup procedure is the same as for steps 3-10 in TS 23.402 [3], clause 7.3.1,
The steps in 4 and 5 describe PCC signalling to provision policies for EPC routed traffic.
4—The description of this step is the same as subclasue 7.2 step 4
5—The description of this step is the same as subclasue 7.2 step 5.
B: The steps in (B) from B.1 to B.2 are the same as subclause 7.2 step (B) from step B.1 to step B.2 and describe PCC Signalling for NS-WLAN offloaded traffic.
6. The description of this step is the same as subclasue 7.2 after step 5.

2. BPCF 234 Requesting to Establish the IP-CAN Session 202 Over S9a Interface 242 for Offloaded Traffic 264.

The BPCF 234 requests to establish the IP-CAN session 202 over the S9a interface 242 when the UE 254 is authenticated, the UE local IP address is assigned by the fixed broadband access network 206, and an indication 401 that the UE 254 is allowed to offload traffic 264 at the fixed broadband access network 206 is received from the BBF AAA 236 (or alternatively from the BNG 238). The SWa/STa interface 249 between the BBF AAA 236 and the 3GPP AAA server 220 is enhanced to carry an indication 401 whether the UE 254 is allowed to perform NS-WLSN offload or not (see FIG. 2).

If the UE 254 is not allowed to perform NS-WLAN offload, then the BPCF 234 will not establish the IP-CAN session 202 to provision policy rules for the offloaded traffic 264. For instance, the BPCF 234 may download policies to the BNG 238 which do not allow offloaded traffic 264 for that UE 254 but do allow traffic 253 from that UE 254 to the PDN GW 218.

Figure 4:
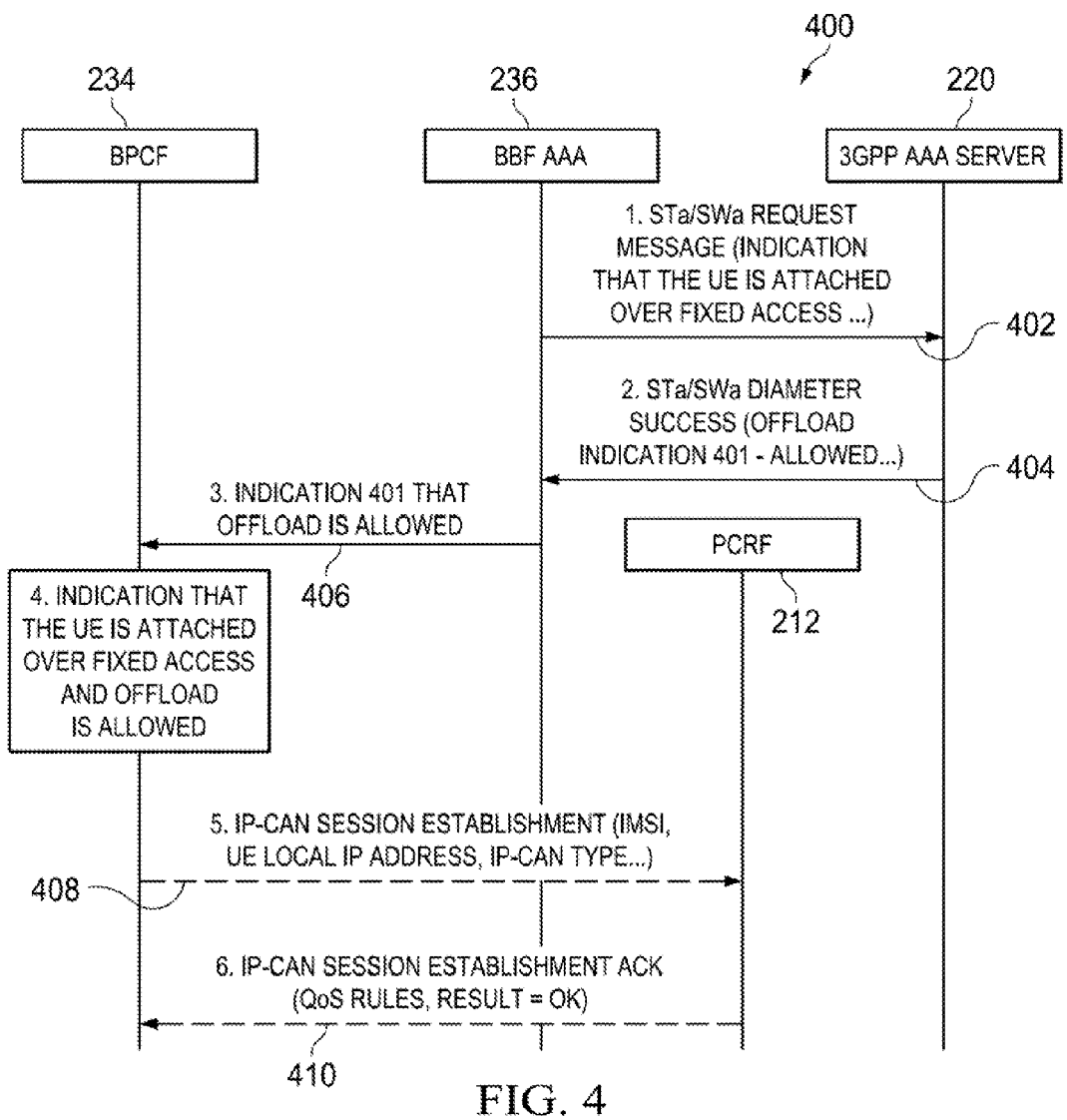
FIG. 4 is a signal flow diagram illustrating the IP-CAN session establishment method for offloaded traffic over the S9a interface when the UE is allowed to do offload triggered by a BPCF within a fixed broadband access network in accordance with an embodiment of the present invention.

An example case where offload is allowed is shown in FIG. 4. Only a subset of the message flow which is needed to describe the second solution has been shown in FIG. 4. Plus, FIG. 4 shows only one example where the indication 401 to the BPCF 234 comes from the BBF AAA 236 but other solutions are also possible. For example, the indication 401 may be sent from the BBF AAA 236 to the BNG 238 which in turn then sends the indication to the BPCF 234.

Referring to FIG. 4, there is a signal flow diagram illustrating the IP-CAN session establishment method 400 for offloaded traffic 264 over the S9a interface 242 to when the UE 254 is allowed to do offload triggered by the BPCF 234 within the fixed broadband access network 206 in accordance with an embodiment of the present invention. In this example, the BBF AAA 236 at step 1 sends a request message 402 (including at least an indication that the UE 254 is attached over the fixed broadband access network 206) over the Sta/SWa interface 249 to the 3GPP AAA server 220. At step 2, the 3GPP AAA server 220 sends a message 404 (indicating whether or not the UE 254 is allowed to do NS-WLAN offload—in this example the UE 254 is allowed) over the Sta/SWa interface 249 to the BBF AAA 236. At step 3, the BBF AAA 236 sends a message 406 (including the indication 401 indicating whether or not the UE 254 is allowed to do NS-WLAN offload—in this example the UE 254 is allowed). At step 4, the BPCF 234 based on the received indication 401 knows that in this example the UE 254 is attached over the fixed broadband access network 206 and NS-WLAN offload is allowed. In this case, the BPCF 234 at step 5 sends the PCRF 212 an IP-Can Session Establishment message 408 (including e.g.: the IMSI of UE 254, the local IP address of UE 254, IP-CAN type) to establish an IP-CAN session 202 over the S9a interface 242 for NS-WLAN offloaded traffic 264. At step 6, the PCRF 212 sends an IP-CAN Session Establishment Acknowledgment 410 (including QoS rules, and result indicator=OK) to the BPCF 234 indicating that the establishment of the IP-CAN session 202 to provision policy rules for offloaded traffic has been made. In the event the UE 254 was not allowed to do NS-WLAN offload, then the BPCF 234 would not execute step 5 and the PCRF 212 would not execute step 6. The indication over STa/SWa in steps 2 and 3 are new when compared to 3GPP TR 23.839. Plus, the steps 3 and 4 are new when compared with the description within the current standardized 3GPP TR 23.839's clause 6.3.1.

2.1 Second Solution's Features

In this solution the existing PCC architecture (which includes the PCRF 212 and the PCEF 218) is reused to provision policies for offloaded traffic 264 and enable the 3GPP AAA 220 to send an indication to the BBF AAA 236 or BNG 238 that the UE 254 is authorized to do offload or not over SWa signalling. This could be based on:

A. The indication 401 (in message 406) is sent over SWa/STa interface 249 that the UE 254 has accessed EPC via Fixed Broadband Access and is allowed to offload traffic in the fixed broadband access.

B. The BPCF 234 would trigger a request (message 408) to establish an IP CAN session 202 for offloaded traffic 264 for the UE 254 over the S9a reference point 242.

C. If policies cannot be downloaded then the BPCF 234 can also send an indication that traffic for this UE 254 from the UE local IP address assigned to the PDN GW 218 is not allowed to the BNG 238.

From the foregoing, one skilled in the art will readily appreciate that the present invention is aimed, at least, to address the aforementioned drawbacks associated with the prior art and to provide for a system, policy nodes, and methods for establishing a policy session (e.g., IP-CAN session) for a user equipment between a first policy node (e.g., BPCF) which is associated with a fixed broadband access network (e.g., non-3GPP access network) and a second policy node (e.g., PCRF) which is associated with an evolved packet core network (e.g., 3GPP access network). In one case, a method is described herein for establishing a policy session for a user equipment between a first policy node which is associated with a fixed broadband access network and a second policy node which is associated with an evolved packet core network. The method comprises the step of establishing the policy session with respect to traffic of the user equipment connected to the fixed broadband access network where the traffic is to be offloaded by the fixed broadband access network without being routed through the evolved packet core network, where the policy session is established over an interface between the first policy node and the second policy node only if the user equipment is authorized from a node of the evolved packet core network to perform traffic offload in the fixed broadband access network. The present invention has many advantages some of which are as follows: (1) the solutions disclosed herein allows a reduction of the signaling load in the PCRF and the BPCF therefore improving their respective performance and capacity; and (2) the solutions disclosed herein also enables control such that if the UE is not allowed to perform NS-WLAN offload then its NS-WLAN offloaded traffic can be discarded at the BNG, redirected (e.g. to a web portal to inform that his subscription does not enable NS-WLAN offload) or blocked (traffic is just discarded) by the BNG.

It should be appreciated that the procedures of the different embodiments described herein can be accomplished by loading computer program instructions executable by any of the functional entities described herein, where these entities are implemented in computer based apparatuses (which is a state of the art solution for them); so that, when these program instructions are loaded and executed by apparatuses implementing these functional entities, they behave for accomplishing these embodiments. Accordingly, the invention disclosed herein can be accomplished by means of a program stored in a transitory, or non-transitory, storage medium for controlling one or more apparatuses to perform a method according to any of the described embodiments. For example, as embodiments of the invention include functional entities described above (e.g., PCRF, SPR or UDR, BPCF, BBF-AAA Server, and 3GPP-AAA Server, etc.), these functional entities are implemented by one or more computer-based apparatuses that include at least one processor, at least one non-transitory computer-readable medium (e.g., a memory) with computer-readable instructions, and may also include other hardware elements (e.g., transmitters, receivers, etc.). The computer-readable instructions, when executed by the at least one processor, implement the functionality performed by the functional entities, as described above.

In the foregoing description, some embodiments are detailed for illustrating examples of cases wherein a policy session in respect to traffic of a UE that is connected to a (first) fixed broadband network, and for controlling traffic of the UE that can be offloaded through the fixed broadband network, is decided to be established or not between nodes (e.g. policy nodes) belonging to the fixed broadband network and nodes (e.g. policy nodes) belonging to an (second) evolved packed core network, EPC. In this respect, and for the sake of clarity and simplicity, the description mentioned in some parts only where the UE is authorized/allowed, or not, by node(s) of the EPC network. However, according to some of the described embodiments, the authorization/allowing decisions made by node(s) of the EPC network for the UE are preferably be taken based on the (identified) user (using for example the IMSI) of the UE and, more precisely, on the data stored by a data storage node 214 (e.g., SPR, UDR) of the EPC network in respect to the (identified) user.

Furthermore, it should be appreciated that modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method for establishing a policy session for a user equipment between a first policy node which is associated with a fixed broadband access network and a second policy node which is associated with an evolved packet core network, the method in a system comprising:

establishing the policy session between the first policy node and the second policy node, wherein the policy session is with respect to traffic of the user equipment connected to the fixed broadband access network where said traffic is to be offloaded by the fixed broadband access network without being routed through the evolved packet core network, wherein the policy session is established over an interface between the first policy node and the second policy node only if the user equipment is authorized from a node of the evolved packet core network to perform traffic offload in the fixed broadband access network, and wherein the user equipment has been authenticated and assigned a local Internet Protocol address by the fixed broadband access network.

2. The method of claim 1, wherein the second policy node interfaces with a data storage node which is the node of the evolved packet core network to determine, based on subscriber data associated with the user equipment, if the user equipment is authorized to perform traffic offload in the fixed broadband access network.

3. The method of claim 2, wherein the data storage node is a Subscriber Profile Repository (SPR) or a User Data Repository (UDR).

4. The method of claim 1, wherein a first authorization node is associated with the fixed broadband access network and a second authorization node which is the node of the evolved packet core network, and wherein the first authorization node and the second authorization node communicate over an interface to determine, based on subscriber data associated with the user equipment, if the user equipment is authorized to perform traffic offload in the fixed broadband access network.

5. The method of claim 4, wherein:
the first authorization node is a broad-band fixed network (BBF) Authentication, Authorization, Accounting (AAA) proxy; and
the second authorization node is a $3^{rd}$ Generation Partnership Project (3GPP) Authentication, Authorization, Accounting (AAA) server.

6. The method of claim 1, wherein:
the first policy node is a broadband policy control function (BPCF);
the second policy node is a policy and charging rules function (PCRF);
the fixed broadband access network is a broadband fixed network (BBF) domain;
the policy session is an IP-Connecting Access Network (IP-CAN) session;
the interface is a S9a interface; and
the offload traffic is Non-Seamless Wireless Local Area Network (NS-WLAN) offload traffic which is offloaded in the fixed broadband access network without being routed through the evolved packet core network.

7. A policy node associated with a fixed broadband access network, comprising:
a processor; and
a memory that stores computer-readable instructions where the processor interfaces with the memory and executes the computer-readable instructions to enable following:
receive a message when a user equipment has been authenticated and a local Internet Protocol address has been assigned by the fixed broadband access network;
send a policy session establishment message over an interface to a policy node associated with an evolved packet core network, the policy session being requested to be established is with respect to traffic of the user equipment connected to the fixed broadband access network that is to be offloaded by the fixed broadband access network without being routed through the evolved packed core network; and
receive a policy session establishment acknowledgment message from the policy node associated with the evolved packet core network, where the policy session establishment acknowledgement message authorizes an establishment of a policy session over the interface for offloaded traffic, and where the policy session establishment acknowledgement message is received only if the user equipment is allowed to offload traffic in the fixed broadband access network without being routed through the evolved packet core network.

8. The policy node of claim 7, wherein the policy session establishment message comprises an International Mobile Subscriber Identity (IMSI) associated to the user equipment, an IP-Connecting Access Network (IP-CAN) type and the local Internet Protocol address of the user equipment.

9. The policy node of claim 7, wherein:
the policy node associated with the fixed broadband access network is a broad band policy control function (BPCF);
the policy node associated with the evolved packet core network is a policy and charging rules function (PCRF);
the fixed broadband access network is a broadband fixed network (BBF) domain;
the policy session establishment message is an IP-Connecting Access Network (IP-CAN) session establishment message;
the policy session is an IP-CAN session;
the interface is a S9a interface; and
the offload traffic is Non-Seamless Wireless Local Area Network (NS-WLAN) offload traffic which is offloaded in the fixed broadband access network without being routed through the evolved packet core network.

10. A method for establishing a policy session between a first policy node associated with a fixed broadband access network and a second policy node associated with an evolved packet core network, where the policy session if established would be with respect to traffic of the user equipment connected to the fixed broadband access network that is to be offloaded by said fixed broadband access network without being routed through the evolved packed core network, the method is implemented by the first policy node and comprises:
receiving a message when a user equipment has been authenticated and a local Internet Protocol address has been assigned by the fixed broadband access network;
sending a policy session establishment message over an interface to a policy node (associated with an evolved packet core network; and
receiving a policy session establishment acknowledgment message from the policy node associated with the evolved packet core network, where the policy session establishment acknowledgement message authorizes an establishment of the policy session over the interface for offloaded traffic, and where the policy session establishment acknowledgement message is received only if the user equipment is allowed to offload traffic in the fixed broadband access network without being routed through the evolved packet core network.

11. The method of claim 10, wherein the policy session establishment message comprises an International Mobile Subscriber Identity (IMSI) associated to the user equipment, an IP-Connecting Access Network (IP-CAN) type and the local Internet Protocol address of the user equipment.

12. The method of claim 10, wherein:
- the policy node associated with the fixed broadband access network is a broadband policy control function (BPCF);
- the policy node associated with the evolved packet core network is a policy and charging rules function (PCRF);
- the fixed broadband access network is a broadband fixed network (BBF) domain;
- the policy session establishment message is an IP-Connecting Access Network (IP-CAN) session establishment message;
- the policy session is an IP-CAN session;
- the interface is a S9a interface; and
- the offload traffic is Non-Seamless Wireless Local Area Network (NS-WLAN) offload traffic which is offloaded in the fixed broadband access network without being routed through the evolved packet core network.

13. A policy node associated with an evolved packet core network, comprising:
- a processor; and
- a memory that stores computer-readable instructions where the processor interfaces with the memory and executes the computer-readable instructions to enable following:
  - receive a policy session establishment message over an interface from a policy node associated with a fixed broadband access network, where the policy session establishment message is a request for authorization to establish a policy session over the interface with respect to traffic of a user equipment connected to the fixed broadband access network that is to be offloaded by the fixed broadband access network without being routed through the evolved packed core network so the user equipment which has been authenticated is allowed to offload traffic in the fixed broadband access network without being routed through the evolved packet core network, and where the user equipment has been authenticated and assigned a local Internet Protocol address by the fixed broadband access network;
  - determine if the user equipment is allowed to offload traffic in the fixed broadband access network without being routed through the evolved packet core network; and
  - if the user equipment is allowed to offload traffic in the fixed broadband access network without being routed through the evolved packet core network, then send a policy session establishment acknowledgment message to the policy node associated with the fixed broadband access network, where the policy session establishment acknowledgement message authorizes an establishment of the policy session over the interface for offloaded traffic.

14. The policy node of claim 13, wherein the policy session establishment message comprises an International Mobile Subscriber Identity (IMSI) associated to the user equipment, an IP-Connecting Access Network (IP-CAN) type and the local Internet Protocol address of the user equipment.

15. The policy node of claim 13, wherein the processor determines if the user equipment is allowed to offload traffic in the fixed broadband access network without being routed through the evolved packet core network by:
- sending a request for subscriber data associated with the user equipment to a data storage node associated with the evolved packet core network; and
- receiving a reply from the data storage node indicating whether or not the user equipment is allowed to offload traffic in the fixed broadband access network without being routed through the evolved packet core network.

16. The policy node of claim 13, wherein:
- the policy node associated with the evolved packet core network is a policy and charging rules function (PCRF);
- the policy node associated with the fixed broadband access network is a broad band policy control function (BPCF);
- the fixed broadband access network is a broadband fixed network (BBF) domain;
- the policy session establishment message is an IP-Connecting Access Network (IP-CAN) session establishment message;
- the policy session is an IP-CAN session;
- the interface is a S9a interface; and
- the offload traffic is Non-Seamless Wireless Local Area Network (NS-WLAN) offload traffic which is offloaded in the fixed broadband access network without being routed through the evolved packet core network.

17. A method for establishing a policy session between a first policy node associated with a fixed broadband access network and a second policy node associated with an evolved packet core network, the method is implement by the second policy node and comprises:
- receiving a policy session establishment message over an interface from the first policy node, where the policy session establishment message is a request for authorization to establish the policy session over the interface, where the policy session if established would be with respect to traffic of the user equipment connected to the fixed broadband access network that is to be offloaded by the fixed broadband access network without being routed through the evolved packed core network, and where the user equipment has been authenticated and assigned a local Internet Protocol address by the fixed broadband access network;
- determining if the user equipment is allowed to offload traffic in the fixed broadband access network without being routed through the evolved packet core network; and
- if the user equipment is allowed to offload traffic in the fixed broadband access network without being routed through the evolved packet core network, then sending a policy session establishment acknowledgment message to the first policy node, where the policy session establishment acknowledgement message authorizes an establishment of the policy session over the interface for offloaded traffic.

18. The method of claim 17, wherein the policy session establishment message comprises an International Mobile Subscriber Identity (IMSI) of the user of the user equipment, an IP-Connecting Access Network (IP-CAN) type and the local Internet Protocol address of the user equipment.

19. The method of claim 17, wherein the determining step further comprises:
- sending a request for subscriber data associated with the user equipment to a data storage node associated with the evolved packet core network; and
- receiving a reply from the data storage node indicating whether or not the user equipment is allowed to offload traffic in the fixed broadband access network without being routed through the evolved packet core network.

20. The method of claim 17, wherein:
- the policy node associated with the evolved packet core network is a policy and charging rules function (PCRF);
- the policy node associated with the fixed broadband access network is a broad band policy control function (BPCF);

the fixed broadband access network is a broadband fixed network (BBF) domain;

the policy session establishment message is an IP-Connecting Access Network (IP-CAN) session establishment message;

the policy session is an IP-CAN session;

the interface is a S9a interface; and the offload traffic is Non-Seamless Wireless Local Area Network (NS-WLAN) offload traffic which is offloaded in the fixed broadband access network without being routed through the evolved packet core network.

21. A system for establishing a policy session for offloaded traffic when a user equipment connects to a fixed broadband access network, where if the policy session is established then the user equipment would be allowed to offload traffic through said fixed broadband access network without being routed through an evolved packet core network, the system comprising:

a first policy node associated with the fixed broadband access network;

a second policy node associated with the evolved packet core network;

the first policy node configured to:
  receive a message when the user equipment has been authenticated and a local Internet Protocol address has been assigned by the fixed broadband access network;

send a policy session establishment message over an interface to the second policy node, where the policy session establishment message is a request for authorization to establish the policy session over the interface so the user equipment which has been authenticated is allowed to offload traffic in the fixed broadband access network without being routed through the evolved packet core network; and the second policy node configured to:
  receive the policy session establishment message over the interface from the first policy node;
  determine if the user equipment is allowed to offload traffic in the fixed broadband access network without being routed through the evolved packet core network; and
  if the user equipment is allowed to offload traffic in the fixed broadband access network without being routed through the evolved packet core network, then send a policy session establishment acknowledgment message to the first policy node, where the policy session establishment acknowledgement message authorizes an establishment of the policy session over the interface for offloaded traffic;

the first node further configured to:
  receive the policy session establishment acknowledgment message from the second policy node.

* * * * *